(12) United States Patent
Kovar et al.

(10) Patent No.: US 6,894,084 B2
(45) Date of Patent: May 17, 2005

(54) NO VOC RADIATION CURABLE RESIN COMPOSITIONS

(75) Inventors: Robert F. Kovar, Waltham, MA (US); Nese Orbey, Acton, MA (US); Stanley Wentworth, Bedford, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 09/781,682

(22) Filed: Feb. 12, 2001

(65) Prior Publication Data

US 2002/0193460 A1 Dec. 19, 2002

Related U.S. Application Data

(60) Provisional application No. 60/220,988, filed on Jul. 25, 2000, and provisional application No. 60/182,619, filed on Feb. 15, 2000.

(51) Int. Cl.⁷ ............................. C08F 2/46; C08F 2/50; C08F 4/44
(52) U.S. Cl. .................. 522/150; 522/96; 522/104; 522/107; 522/113; 522/105; 522/114; 522/120; 522/122; 522/121; 522/153; 522/151; 522/152; 522/154; 522/168; 522/169; 522/173; 522/174; 522/178; 522/182; 522/71; 522/83; 522/33; 522/77; 522/42; 522/60; 522/64; 522/66; 427/508
(58) Field of Search ..................... 522/90, 96, 104, 522/105, 107, 113, 114, 120, 121, 122, 150, 153, 151, 152, 154, 168, 169, 173, 174, 178, 182, 71, 83, 33, 42, 77, 60, 64, 66; 427/508

(56) References Cited

U.S. PATENT DOCUMENTS

| | | |
|---|---|---|
| 3,010,918 A | 11/1961 | Ikeda et al. |
| 3,010,923 A | 11/1961 | Ikeda et al. |
| 3,043,851 A | 7/1962 | Fischer et al. |
| 3,058,933 A | 10/1962 | Ikeda et al. |
| 3,301,693 A | 1/1967 | Ikeda |
| 4,157,421 A | 6/1979 | Barclay et al. |
| 4,182,848 A | 1/1980 | Barclay et al. |
| 4,206,099 A | 6/1980 | Bentley et al. |
| 5,945,488 A | 8/1999 | Gregorovich et al. |
| 5,977,269 A | 11/1999 | Kovar et al. |
| 6,150,429 A | 11/2000 | Kovar et al. |

*Primary Examiner*—James J. Seidleck
*Assistant Examiner*—Sanza L. McClendon
(74) *Attorney, Agent, or Firm*—Linda M. Buckley; John B. Alexander; Edwards & Angell, LLP

(57) ABSTRACT

The present invention provides radiation curable resin compositions that contain no or essentially no volatile organic components (VOCs), and to methods of using these compositions. The radiation curable resin compositions find particular use as coating compositions. In particular, the radiation curable resin compositions of this invention comprise a vinyl dioxolane end-capped oligomer blended with a photoinitiator.

72 Claims, 11 Drawing Sheets

IR spectrum of dimethyl 1,4-cyclohexanedicarboxylate

*IR spectrum of the reaction dispersion prior to any prepolymer formation*

IR spectrum of the reaction dispersion after appreciable amounts of PETD prepolymer has formed Chemical structure of PEVD prepolymer labeled for NMR analysis ¹HNMR spectrum of purified PEVD prepolymer ¹³C NMR spectrum of purified PE7D prepolymer

NO VOC RADIATION CURABLE RESIN COMPOSITIONS

The present application claims the benefit of U.S. provisional application No. 60/182,619, filed on Feb. 15, 2000; and U.S. provisional application No. 60/220,988, filed on Jul. 25, 2000, which is a continuation-in-part of U.S. provisional application No. 60/182,619, the teachings of which are incorporated herein by reference.

STATEMENT OF GOVERNMENT INTEREST

Funding for the present invention was obtained from the Government of the United States by virtue of Contract No. F09650-98-M-1024 from the U.S. Department of the Air Force. Thus, the Government of the United States has certain rights in and to the invention claimed herein.

FIELD OF THE INVENTION

This invention relates to radiation curable resin compositions that contain no or essentially no volatile organic components (VOCs), and to methods of using these compositions. The radiation curable resin compositions find particular use as coating compositions. In particular, the radiation curable resin compositions of this invention comprise a vinyl dioxolane end-capped oligomer blended with a photoinitiator.

BACKGROUND OF THE INVENTION

Curable resins are suitable for a variety of applications. For example, curable resins have been used as coatings, sealants and adhesives, and in producing molded articles. The manufacturing facilities that utilize conventional curable resins in their operations are typically expensive to maintain due to the nature of these resins. Conventional curable resins are typically solvent-based and contain volatile organic components (VOCs). VOCs favorably affect the viscosity of curable resins, and often VOCs are added so as to make the curable resin composition sprayable. This is a particularly desired quality for coating applications (e.g. furniture, automobile, ship, aircraft and other transportation vehicle coating applications). However, during the application and cure of these conventional resin compositions, substantial amounts of VOCs are released into the atmosphere. This is a serious problem because VOCs are toxic, flammable, explosive, smog-producing and noxious. As a result, elaborate and expensive fire and explosion-prevention measures, worker protection measures and pollution control equipment are required during the use of such conventional resins.

A number of resin manufacturers are currently developing low/no VOC curable resin formulations including, high solids, blocked isocyanate polyurethanes and aqueous-based polyurethane dispersions. These emerging resins possess certain advantageous attributes, but not without specific drawbacks. High solids formulations use low VOCs and provide equivalent performance to low solids urethanes, but cannot be applied using spraying techniques. Blocked isocyanate polyurethanes also use low VOCs and have low toxicity levels and good properties. These materials however, must be cured at elevated temperatures around 150 to 200° C., which is not practical in most applications, for example in coating automobiles and aircraft. Aqueous based polyurethanes use no VOCs, are nontoxic and easy to apply via spraying. To date, however, these polyurethanes have not provided the properties required to meet military specifications, such as adhesion and moisture-resistance, desired for high performance applications.

Polyesters have emerged as promising candidates for inclusion as components in advanced aircraft coatings. Polyesters are polymers formed by the reaction of aliphatic or aromatic polyol monomers with aromatic or aliphatic diacids in the presence of catalyst, usually, metallic acetates, such as calcium acetate. Polyesters can provide a combination of useful properties including: clarity, transparency, absence of color, flexibility, excellent adhesion to most substrates, abrasion-resistance, water-resistance, fuel and oil-resistance, UV-resistance, weather-resistance, variable hardness (from elastomer to tough plastic), moderate cost, low temperature flexibility and availability as variable molecular weight, ester-endcapped, difunctional prepolymers.

Polyester polymers cannot be used as curable resins themselves, however, since their functionality is not conducive to the formation of hard, cross-linked structures. To be used advantageously as advanced coatings, polyester polymers must first be functionalized with reactive groups, such as hydroxyl groups, and then cured by chemical reaction with other comonomers, such as polyurethane diisocyanate monomers, into hard, tough polymer resins that can be used as protective coatings. Hydroxy-functional, polyester-based reactive prepolymers are frequently selected for use as components in polyurethane coatings over polyether and other type, polymers since they typically impart superior solvent-resistance, mechanical toughness and clarity to the coating and do not yellow upon exposure to intense UV light.

The major problems associated with the use of polyester-derived polyurethanes have involved the requirement for addition of substantial quantities of flammable, toxic solvents to polyurethane coating formulations to lower viscosity sufficiently for spray-painting operations. Another problem involved the use of toxic, irritating and volatile diisocyanate monomer components as major components in the polyurethane coating. The vapors that evolve from polyurethane operations may cause serious injury to workers breathing the fumes if they do not wear protective equipment.

A number of polyester-polyurethane coating manufacturers have been actively pursuing the development of low VOC and no VOC polyurethane curable resin formulations. To date however, none of these resins have exhibited the required processability or properties for use in e.g., automotive and aircraft coatings.

For example, damaged areas on U.S. Air Force aircraft are currently repaired on-site using aerosol sprayed coating compositions containing single component polyurethane enamel. Generally, these compositions are sprayed on the damaged portion of the aircraft and allowed to dry.

One disadvantage associated with such methods and compositions is that substantial amounts of volatile organic solvents (VOCs) are released into the atmosphere during application. In addition, such "touch-up" methods and compositions result in coatings having significantly inferior properties as compared to the original coating. Namely, the portions of the aircraft that are repaired using these one component polyurethane enamels have inferior abrasion-resistance, UV stability and fuel/oil resistance properties as compared to the original two-component polyurethane (PUR) coating of the aircraft. This is because unlike the two-part PURs, the one component coating formulation does not cure in-situ to form a crosslinked urethane structure in place, but, rather, simply deposits as a film upon evaporation of solvent.

Two-component aliphatic polyurethane compositions have been developed which provide satisfactory performance as aircraft coatings after drying and cure. However, to date, these coating compositions require the use of large quantities of flammable, toxic and environmentally hazardous organic solvents/diluents to produce low viscosity sprayable coatings. In addition, these polyurethane coating compositions utilize pure aliphatic diisocyanate as one of the reactive components. During coating and cure operations the pure aliphatic diisocyanate component liberates toxic vapors that may harm the workers and the environment.

A number of aircraft coating manufacturers are currently developing low/no VOC coating formulations including, high solids, blocked isocyanate polyurethanes and aqueous-based polyurethane dispersions. However, to date, these new materials have either been too high in viscosity for spraying, require excessive temperatures for cure (150 to 200° C.) or simply did not provide the properties required to meet military specifications. For example, while the high solids formulations use low VOCs and provide performance equivalent to that of low solids urethanes, these formulations cannot be applied using spraying techniques. Blocked isocyanate polyurethanes also use low VOCs, have low toxicity levels and good properties. However, these materials must be cured at elevated temperatures (150 to 200° C.), which are not practical when coating aircraft, since must be coated at ambient temperature. Aqueous based polyurethanes use no VOCs, are nontoxic and easy to apply via spraying. However, to date, these compositions do not provide the properties required to meet military specifications, such as adhesion and moisture-resistance.

Furthermore, current coating repair processes do not take into account the need to replace the underlying corrosion-resistant conversion coating and primer coating layers that were originally applied to the aircraft aluminum surface skin prior to application of the PUR topcoat. During surface preparation for re-coating, most damaged coatings are currently sanded down to bare metal, thereby removing any primer and conversion coating that might have remained and exposing the metal to the threat of corrosion, even after application of topcoat.

Accordingly, what is needed are improved curable resin compositions that contain no or substantially no VOC's and methods of using these compositions whereby no VOC's are released. It is desired that these curable resin compositions are convenient to apply, and, preferably are sprayable. It is further required that these coating compositions air-dry at room temperature with or without application of a UV-source.

Specifically, in the case where the curable resin compositions are used as coatings to repair aircraft, it is desired that these coating compositions and methods provide equivalent or better performance than conventional two-component polyurethane (PUR) coatings that are used on aircraft. Namely, it is desired that these coating compositions provide excellent adhesion to aircraft surfaces after drying, protect against corrosion, UV rain erosion, small particle impact and weathering, and resist the effects of operational fluids (fuel, lubrication, hydraulic and deicing) and moisture. It would further be advantageous to provide coating compositions that may be easily removed by stripping if required.

SUMMARY OF THE INVENTION

Figure 1:
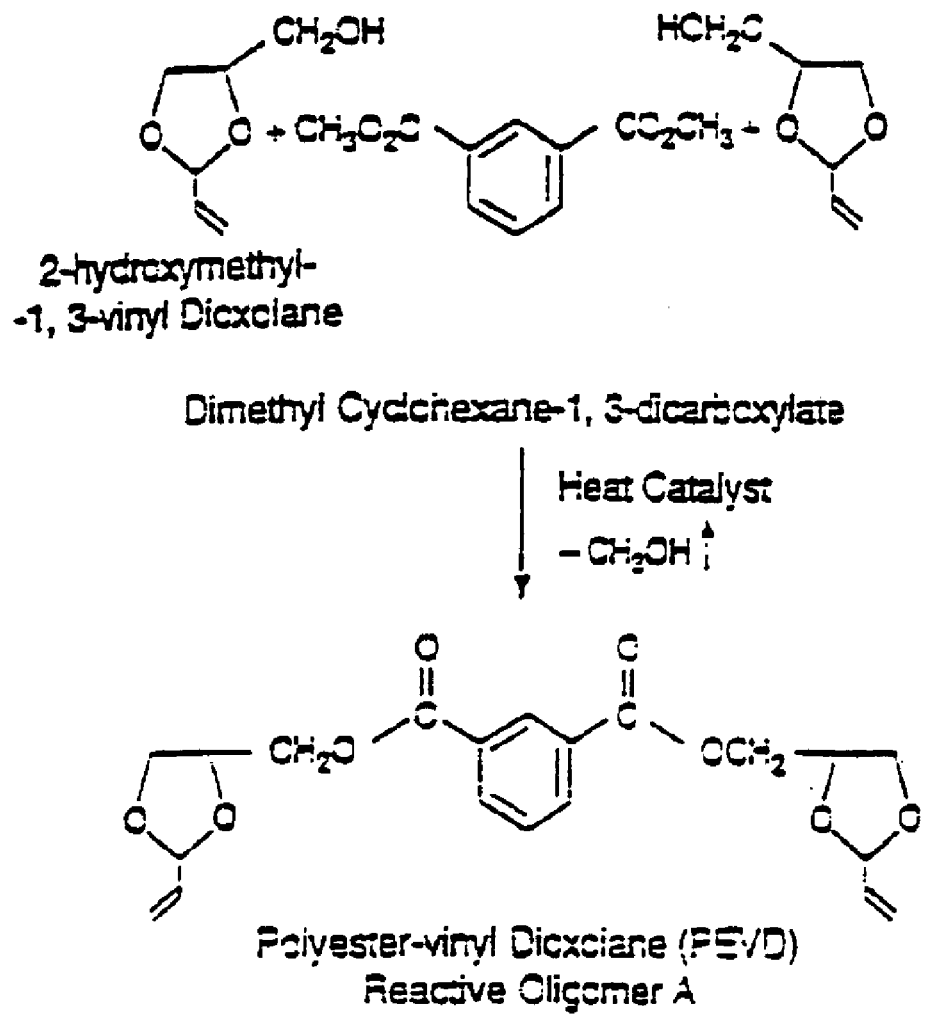
FIG. 1 shows the synthesis of one preferred vinyl dioxolane end-capped polyester.

The present invention provides environmentally-compliant radiation curable resin compositions that contain no or essentially no volatile organic components ("VOCS"). The cured coatings of the present invention cure within minutes at air temperature, to form hard, durable resins with excellent adhesion, solvent resistance and water resistance. These radiation curable resin compositions are easy to apply, and are preferably sprayable.

The radiation curable resin compositions of the present invention find particular use as coating compositions for vehicles such as airplanes, automobiles, and ships, for furniture and even building structures. The compositions are particularly suitable for use in repairing U.S. Air Force aircraft because these compositions cure to form coatings having excellent properties that match and even exceed the original two-component polyurethane (PUR) coating of such aircraft. Namely, the cured coatings of the present invention possess excellent abrasion-resistance, UV stability and fuel/oil resistance properties that are equal to and superior to the original coating applied to the aircraft. Further, these compositions cure within minutes at ambient temperature.

The radiation curable resin compositions of the present invention comprise a vinyl dioxolane end-capped oligomer, and at least one photoinitiator to initiate cure of the resin.

The term "radiation curable" as used herein is defined as the capacity to be cured under the influence of ultraviolet (UV), visible (VIS) or electron beam (EB) irradiation.

Preferred vinyl dioxolanes for use in the present invention include: substituted or unsubstituted vinyl hydroxy alkyl dioxolanes and vinyl carboxy alkyl dioxolanes. Vinyl dioxolane monomers used in forming the curable resin compositions of the present invention have the formula:

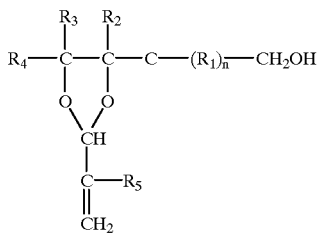

wherein $R_1$, is an alkyl group preferably having from about 1 to 10, and more preferably no more than about 6 carbon atoms. $R_2$, $R_3$, $R_4$ and $R_5$ may be the same or different and each represents hydrogen or an alkyl group, having from about 1 to 10, and more preferably having from about 1 to 4 carbon atoms. Most preferably $R_2$, $R_3$, $R_4$ and $R_5$ are hydrogen.

The vinyl dioxolane monomers may be either substituted or unsubstituted. More specifically, the vinyl dioxolane monomers for use in the present invention are preferably selected from substituted or unsubstituted vinyl hydroxy alkyl dioxolanes and vinyl carboxy alkyl dioxolanes, which have from 2 to about 10 carbons. Particularly useful as vinyl dioxolane monomers in the present invention are 2-vinyl-4-hydroxybutyl-1.3-dioxolane (HBVD) and 2-vinyl-4-hydroxymethyl-1,3-dioxolane (HMVD).

Preferred vinyl dioxolane end-capped oligomers for use in the present invention include: polyurethanes, polyesters, acrylates, and copolymers and blends thereof.

One preferred vinyl dioxolane end-capped oligomer comprises a polyester. The term "polyester" as used herein also includes polymers which are not made up fully of polyester linkages. For example, other linkages which may also be present in a vinyl dioxolane end-capped, enzyme degradable polyester oligomer of the present invention, depending upon ingredients used and reaction conditions, include those having isocyanate, cyclohexane and amide linkages along the backbone. Aliphatic polyester segments are particularly preferred. As used herein, the term "aliphatic" includes "cycloaliphatic" and saturated and unsaturated groups.

Aliphatic polyesters are preferred over aromatic polyesters in preparing the enzyme degradable oligomers of the present invention, particularly in forming colorless coatings, even though aromatic polyester groups are considerably more reactive than the aliphatic polyester groups for a number of reasons. Coating products made from aromatic polyesters suffer the disadvantage that they degrade more easily than do those prepared from aliphatic polyesters, especially when exposed to UV light. The higher resistance of products prepared from aliphatic polyesters to UV light-induced degradation means that coatings based on them have better yellowing and chalk resistance than those based on aromatic polyesters.

Another preferred vinyl dioxolane end-capped oligomer comprises a polyurethane. The term "polyurethane" as used herein includes polymers which are not made up fully of polyurethane linkages. For example, ureas, allophanates, cyanurates and other linkages, may also be present in a vinyl dioxolane end-capped polyurethane oligomer of the present invention, depending upon ingredients used and reaction conditions. Additionally, isocyanates may be reacted with themselves to form polymeric forms of isocyanate linked together by isocyanurate and/or carboniimide bridges. The term polyisocyanate refers to an isocyanate having at least two —NCO groups per molecule.

In forming the vinyl dioxolane end-capped polyurethanes of the present invention, aliphatic or aromatic polyisocyanates and isocyanate end-capped aliphatic or aromatic urethane prepolymers are particularly useful. Some preferred aliphatic polyisocyanates include hexamethylene diisocyanate, 4,4-bis(cyclohexyl)methane diisocyanate, bis (4-isocyanato-cyclohexyl)methane, isophorone diisocyanate, 1-methylcyclohexane-2,4-diisocyanate and 4,4',4"-tricyclohexylmethane triisocyanate. A preferred aliphatic polyisocyanate is a 1,6-hexamethylene diisocyanate based polyisocyanate. One such particularly preferred 1,6-hexamethylene diisocyanate based polyisocyanate has a viscosity at 23° C. of from about 90 to about 250 mPa·s, such as commercially available DESMODUR N3400. Another preferred 1,6-hexamethylene diisocyanate based polyisocyanate has a viscosity at 25° C. of from about 1,300 to about 2,200 mPa·s, such as commercially available DESMODUR N3200. Preferred isocyanate end-capped aliphatic urethane prepolymers include hexamethylene diisocyanate aliphatic polyester polyol or polyether polyol. A particularly preferred isocyanate used in preparing the vinyl dioxolane end-capped polyurethane is an aromatic isocyanate: tetramethyl xylene diisocyanate (TMXDI).

Another preferred vinyl dioxolane end-capped oligomer comprises polyurethane acrylates. Polyurethane acrylates are available commercially, and include, for example, CN985-B88, CN963-B80, CN964-B85, CN-965-A80 and CN966-J75, all available from Sartomer, Inc. Alternatively, polyurethane acrylates may be synthesized by the reaction of a hydroxy-functional acrylate with at least one of a branched polyfunctional isocyanate, aliphatic isocyanate-terminated urethane prepolymer, or aliphatic isocyanate-terminated polyester. One preferred polyurethane acrylate comprises the reaction product of an acrylate and at least one aliphatic isocyanate-terminated urethane prepolymer having a molecular weight ranging from about 500 to 1000, and more preferably, having a molecular weight ranging from about 500 to 600. A particularly preferred polyurethane acrylate comprises the reaction product of an acrylate and at least one HMDI-terminated polyethyleneadipate aliphatic urethane prepolymer.

Preferred photoinitiators include those that are soluble in the monomer, absorb light at the wavelength of UV or visible light cure, and then form active species such as radicals that initiate polymerization and cure of the coating resin. For example, some preferred photoinitiators comprise: alpha hydroxy ketones, polymeric hydroxy ketones, trimethylbenzophene, methylbenzophenone, 2 hydroxy-2-ethyl-phenyl-1-propane, phosphine oxide, bis(2,4,6-trimethylbenzoyl)-phenylphosphineoxide, 1-hydroxy cyclohexyl ketone, benzyl dimethyl ketal, trimethylbenzophenone, benzophenone, bis $\eta^5$-2,4-cyclopentadien-1-yl) bis(2,6-difluoro-3-(1H-pyrrol-1-yl) phenyl) titanium and blends thereof. A particularly preferred photoinitiator is an alpha hydroxy ketone based photoinitiator. The photoinitiators are added in amounts ranging from about 0.5% to about 10% by weight of the composition. Preferably, the photoinitiators are added in amounts ranging from about 2% to about 6% by weight of the composition, and more preferably, in amounts ranging from about 4% to about 5% by weight of the composition.

Thus, in one preferred polyester or polyurethane curable resin composition of the present invention, the substituted vinyl dioxolane monomer is 2-vinyl-4-hydroxymethyl-1,3-dioxolane (HMVD) or 2-vinyl-4-hydroxybutyl-1,3-dioxolane (HBVD) or a blend thereof, the ester of a polycarboxyl acid is dimethyl-1,4-cyclohexanedicarboxylate (DMCDC) or the polyurethane is tetramethyl xylene diisocyanate (TMXDI) and the photoinitiator is an alpha hydroxy ketone photoinitiator.

In some embodiments, the radiation curable resin composition further comprises at least one reactive diluent, which may be added to obtain desired properties, e.g., a sprayable curable resin, a desired degree of crosslinking, increased flexibility or enhanced water-resistance. Some examples of reactive diluents suitable in the present invention include vinyl dioxolanes, such as HMVD and HBVD, methyl ether derivatives of HMVD and HBVD, unsubstituted vinyl dioxolane, alkylated vinyl dioxolane, trimethylopropane triacrylate (TMPTA), diethylene glycol diacrylate (DGD), tetrahydroopurfuryl acrylate, 2-phenoxyethyl acrylate, isooctyl acrylate, propoxylated neopentyl glycol diacrylate, triethylene glycol diacrylate, lauryl acrylate, hexanediol diacrylate, polyester vinyl dioxolane (PEVD), and blends thereof.

DGD is a particularly particularly preferred reactive diluent. These reactive diluents are added in amounts ranging from about 1% to about 50% by weight of the composition. More preferably, these reactive diluents are added in amounts ranging from about 10% to about 25% by weight of the composition.

In some embodiments, when desired, the radiation curable resin composition further comprises at least one pigment, such as titanium dioxide and carbon black, to impart a color on the cured resin. These pigments are added in amounts ranging from about 0.1% to about 30% by weight of the composition. In some embodiments, when pigments are added, photoinitiators having a higher absorption band than the pigments are required.

In some embodiments, processing aids are added to the radiation curable resin composition to facilitate the development of smooth, adherent and defect free coatings. Such processing aids may include co-initiators, wetting agents, coupling agents, adhesion promoters and thixotropic agents. Some useful co-initiators include reactive amines such as Sartomer CN381 (viscosity of 95 cps at 25° C.), Sartomer CN384 (viscosity of 100 cps at 20° C.), and Sartomer CN386 (viscosity of 25 cps at 25° C.). These co-initiators are added in amounts of up to about about 5 weight percent. Conventional wetting agent may further be added in amounts of up to about 0.5 weight percent. A useful coupling agent is a silane coupling agent, which may be added in amounts of up to about 1.5 weight percent. A preferred thixotropic agent is fumed silica, which may be added in amounts of up to about 10 weight percent.

It has unexpectedly been found that fillers may be added to the present composition. Fillers suitable for use in the present invention do not substantially interact adversely with the cure mechanism or the properties of the cured coating. Some preferred fillers include, for example, organic and inorganic fillers which impart desired electromagnetic or conductive properties or performance, color, opacity, abrasion resistance, hardness and the like. Examples of such fillers include Ni coated carbon powder fillers and iron powder fillers. Other examples of suitable fillers include, for example, pigments such as those set out above, including titanium dioxide, carbon black and thiokol blue.

In one preferred embodiment, both UV cure (photoinitiator) and thermal cure catalysts are added to the composition. Such compositions may then be cured both by thermal and UV means. For example, during UV cure, substantial heat is released, thereby combining both UV and thermal initiation for the cure of the composition. Photoinitiators and thermal cure catalysts suitable for use in the present invention do not substantially interact adversely with the cure mechanism or the properties of the cured coating. Some preferred thermal cure catalysts include, for example, peroxides, cobalt and combinations of peroxides and cobalt. One particualrly preferred thermal cure catalyst is a peroxide combined with at least one transition metal soap, such as Co, Mn or Al, which act as promoters. In particularly preferred embodiments, the peroxide is a high temperature peroxide such as tertiary butyl perbenzoate, 2,5-dimethyl-2,5-di(t-butylperoxy)hexane, dicumylperoxide, benzoyl peroxide and MEK peroxide, which convey shelf life stability and completes cure in thickly coated sections, eg. greater than about 2 mils and up to about 50 mils.

In one preferred embodiment, the radiation curable resin composition is used to repair an aircraft by a procedure such as the following: strip the damaged area of the aircraft to bare metal; apply a non-chromate conversion coating, preferably by spraying; apply a non-chromate conversion coating primer, preferably by spraying; apply the radiation curable resin composition, preferably by spraying; cure the resin composition by either a visible or UV source range.

DETAILED DESCRIPTION OF THE INVENTION

The present invention provides radiation curable resin compositions that contain no or essentially no volatile organic components ("VOCs"), and methods of using these compositions. The radiation curable resin compositions comprise (i) at least one radiation curable vinyl dioxolane (VDO) end-capped oligomer and (ii) at least one photoinitiator to initiate UV or visible light cure of the composition.

The vinyl dioxolane monomers for use in the present invention are readily made by known methods, e.g., by condensing an unsaturated aldehyde, such as acrolein, with an appropriate 1,2-diol or triol, such as glycerol, in the presence of an acidic catalyst, such as p-toluenesulfonic acid. Such substituted vinyl dioxolane monomers are autooxidizable, that is, on exposure to the air the monomer undergoes a cross-linking reaction. The mechanism of cure has been reported to involve a ring-opening reaction in the presence of air and catalyst, forming pendant hydroxyl groups (which contribute strong adhesive properties) and polymerizing the vinyl group into a highly cross-linked, hard structure. Accordingly, in forming substituted vinyl dioxolane end-capped polyurethane oligomers for use in the present invention, care must be taken to avoid the use of reactants which cause premature opening of the ring. For example, the substituted vinyl dioxolane monomers should be stable to selected reaction catalysts for formation of the vinyl dioxolane end-capped, enzyme degradable oligomers. Preferred vinyl dioxolane monomers are stable in the presence of the catalyst systems of the present invention.

HMVD and HBVD are readily synthesized from the reaction of low-cost starting materials. For example, they may be made by condensing an unsaturated aldehyde, such as acrolein, with an appropriate 1,2-diol or triol, such as glycerol, in the presence of an acidic catalyst, such as p-toluenesulfonic acid. This synthesis is shown below:

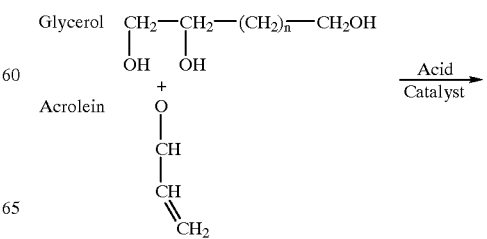

-continued

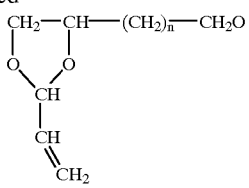

In the case of HMVD, n=0 and of HBVD, n=3.

Vinyl dioxolanes suitable for use in the present invention are described for example, in U.S. Pat. No. 3,010,923 (the '923 patent) the teachings of which are incorporated by reference, which disclosed substituted vinyl dioxolane compounds for coating applications which contain a plurality of 2-vinyl-1,3-dioxolane groups. Although the '923 patent taught that the coating compositions disclosed therein can be applied in aqueous media, the '923 patent taught that spraying of the disclosed compositions is achieved by diluting with a volatile organic solvent such as toluene. See, e.g., column 15, lines 26–29 and lines 40–49. Furthermore, it appears that the only coating composition reported to be free of solvent suggested in the '923 patent can be found in Example 68. See also related U.S. Pat. Nos. 3,010,918; 3,055,766; 3,058,933; and 3,245,927.

Preferred substituted vinyl dioxolane monomers for use in forming the vinyl dioxolane end-capped oligomers of the present invention have a rapid rate of reaction with the alkyl ester or isocyanate component; are low in volatility and toxicity; and provide coatings having transparency and appropriate color which cure in air at room temperature in presence of a photoinitiator under a visible or UV source range.

Examples of suitable vinyl dioxolane end-capped oligomers for use in the present invention include polyesters, acrylates, polyurethanes, and copolymers and blends thereof.

One preferred vinyl dioxolane end-capped oligomer comprises a polyester. In some embodiments, the vinyl dioxolane end-capped polyester comprises the reaction product of a vinyl dioxolane monomer, as set out above, and an ester of a polycarboxylic acid having the formula:

wherein $R_6$ is a branched or unbranched, saturated or unsaturated, alkyl or alkoxy group having from 1 to about 20 carbon atoms or a cyclic alkyl or alkoxy group having from about 1 to about 20 carbon atoms: and $R_7$ and $R_8$ are the same or independently selected from —$CH_3$ or an alkyl group having up to about 10 carbon atoms; and $R_9$ is —H or a branched or unbranched alkyl or alkoxy group having from 1 to about 20 carbon atoms or a cyclic alkyl or alkoxy group having from 1 to about 10 carbon atoms. In some embodiments, $R_6$ further comprises at least one amide linkage.

Some examples of esters of polycarboxylic acids are useful in the practice of the present invention include hydroxy functional, saturated and unsaturated, alkyl esters, such as, adipate phthalate, and malonate esters; cyclohexane dicarboxylic acid esters; and various alkyl ployols, such as ethylene glycol based polyesters. Polyester prepolymers useful in the practice of the present invention also include those having cyclohexane groups along the backbone, as well as amide containing oligomers.

Difunctional saturated polyester oligomers are preferred components of the coating compositions of the present invention. Saturated esters are especially preferred for colorless coatings, because they are less light-sensitive and, thus, less prone to yellow. Particularly preferred saturated esters include adipate and cyclohexane diesters.

Aliphatic polyesters sometimes are preferred over aromatic polyesters in preparing the vinyl dioxolane end-capped oligomers of the present invention, particularly in forming colorless coatings, even though aromatic polyester groups are considerably more reactive than the aliphatic polyester groups for a number of reasons. Coating products made from aromatic polyesters suffer the disadvantage that they degrade more easily than do those prepared from aliphatic polyesters, especially when exposed to UV light. The higher resistance of products prepared from aliphatic polyesters to UV light-induced degradation means that coatings based on them have better yellowing and chalk resistance than those based on aromatic polyesters.

However, aromatic polyesters may also be used in the practice of the present invention.

Dimethyl 1,4-cyclohexane dicarboxylate is one preferred polyester prepolymer for use in the coatings of the present invention and can be prepared by reacting HMVD and dimethyl 1,4-cyclohexane dicarboxyate as illustrated in FIG. 1.

Table 1 summarizes the properties of some radiation cured PEVD coating formulations.

TABLE 1

PEVD Coating Results

| Coating Formulation | Advantages | Disadvantages |
|---|---|---|
| PEVD + photoinitiator | Cures within a minute<br>Hard coating<br>Excellent adhesion | Not sprayable |
| PEVD with 5% monofunctional reactive diluent + photoinitiator | Cures within a minute<br>Excellent adhesion<br>Sprayable | Soft coating |
| PEVD with 25% difunctional reactive diluent + photoinitiator | Cures within a minute<br>Hard coating<br>Sprayable | Mediocre adhesion |
| PEVD with 5% monofunctional reactive diluent + photoinitiator | Cures within a minute<br>Excellent adhesion<br>Hard coating | Barely sprayable |

The coating compositions prepared from vinyl dioxolane end-capped polyesters were often higher in viscosity than that suitable for spray applications. It is anticipated that the properties of these coating composition and the coatings formed therefrom can be tailored, for example, by blending at least one reactive diluent as described herein, prior to or after the reaction, between the polyester prepolymer component and the vinyl dioxolane monomer or by blending different vinyl dioxolane end-capped polyester oligomers of the present invention after their synthesis. Further, some vinyl dioxolane end-capped polyester compositions did not achieve the desired adhesion to the aluminum substrate. However, these coatings are expected to be useful for other sufraces. It is also anticipated that coating properties can be optimized as desired by varying reaction components and/or conditions, e.g., adhesion to an aluminum surface may be improved by, for example, the addition of adhesion promoters, use of different reactive diluents and, for example, by blending the PEVD compositions with PUVD compositions described herein.

Another preferred vinyl dioxolane end-capped oligomer comprises a polyurethane. In some embodiments, the vinyl dioxolane end-capped polyurethane comprises the reaction product of a vinyl dioxolane monomer, as set out above, and (i) at least one isocyanate or polyisocyanate having the formula $$R_6(NCO)_p \quad \text{Formula 1}$$

wherein $R_6$ is an aliphatic or cycloaliphatic alkyl group having from 1 to about 10 carbon atoms or an aromatic group and p is at least 1, or (ii) at least one isocyanate-endcapped aliphatic urethane prepolymer having the formula

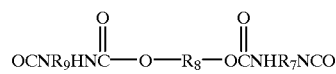

Formula 2 wherein $R_7$, $R_8$ and $R_9$ are independently an aliphatic or cycloaliphatic alkyl group having from 1 to about 10 carbons. Isocyanate-endcapped aromatic urethane prepolymers may also be useful in the practice of the present invention.

Aliphatic isocyanates are sometimes preferred over aromatic isocyanates in preparing the reactive oligomers of the present invention even though aromatic isocyanate groups are considerably more reactive than the aliphatic isocyanate groups, resulting in coatings that dry faster and develop cure properties faster than comparable systems based on aliphatic isocyanates for a number of reasons. Urethane products made from aromatic diisocyanate monomers suffer the disadvantage that they degrade more easily than do those prepared from aliphatic diisocyanate monomers, especially when exposed to UV light. The higher resistance of products prepared from aliphatic diisocyanates to UV light-induced degradation means that coatings based on them have better yellowing and chalk resistance than those based on aromatic diisocyanates. Nonetheless, aromatic isocyanates may also be preferred for certain embodiments. As used herein, the term "aliphatic" includes "cycloaliphatic."

Preferred isocyanates for use in forming vinyl dioxolane end-capped urethane polyurethane oligomers for use in the coating compositions of the present invention have a rapid rate of reaction with the substituted vinyl dioxolane monomer; are low in volatility and toxicity (e.g., no isocyanate vapors); provide coatings having transparency and appropriate color which cure at room temperature in presence of a catalyst; and, in particularly preferred embodiments, react to form spray-coatable vinyl dioxolane end-capped polyurethane oligomers.

Suitable aromatic and aliphatic, including cycloaliphatic, isocyanates for use in preparing the reactive oligomers of the present invention include mono, di, tri, and other polyisocyanates. A preferred monomeric diisocyanate is bis(4-isocyanato-cyclohexyl)methane, commercially available from Bayer Corporation as DESMODUR W. Other preferred diisocyanates include:

tetramethyl xylene diisocyanate (TMXDI)
hexamethylene diisocyanate
4,4-bis(cyclohexyl)methane diisocyanate
isophorone diisocyanate
1-methylcyclohexame-2,4-diisocyanate
4,4',4"-tricyclohexylmethane triisocyanate Preferred polyisocyanates for use in the sprayable coating compositions of this invention include polymeric isocyanates derived from various aromatic and aliphatic diisocyanates, such as hexamethylene diisocyanate and TMXDI. 1,6-hexamethylene diisocyanate-based polyisocyanates are preferred in some applications. A particularly preferred 1,6-hexamethylene diisocyanate-based polyisocyanate has a viscosity of from about 90 to 250 mPa·s at 25° C. and an NCO content of about 20 to 30%. These polyisocyanates are made by methods known to the skilled artisan. Such polyisocyanates are also commercially available from Bayer as DESMODUR N100, DESMODUR N3200 and DESMODUR N3400.

An aliphatic 1,6-hexamethylene diisocyanate based polyisocyanate having a viscosity @ 23° C. of about 90–250 mPa·s, such as DESMODUR N3400, is an especially preferred aliphatic polyisocyanate for preparing vinyl dioxolane end-capped polyurethane oligomers of the present invention because it exhibited the following advantageous properties:

Rapid reaction with vinyl dioxolane monomer
Extremely low volatility and toxicity (no isocyanate vapors)
Produced low viscosity spray-coatable vinyl dioxolane end-capped polyurethane oligomer formulations
Produced a transparent, colorless polyurethane/vinyl dioxolane based coating that cured at room temperature in the presence of photoinitiator and radiation source.

Isocyanate-endcapped aliphatic urethane prepolymers are known to the skilled artisan and many are commercially available. Such prepolymers for use in forming the vinyl dioxolane end-capped polyurethane oligomers for use in the present invention include, for example, the prepolymer prepared from hexamethylene diisocyanate aliphatic polyester and polyether polyols, such as polycaprolactam and polyethylene adipate derived polyester polyols, and polytertramethylene polyether polyols.

A particularly preferred aromatic isocyanate is tetramethyl xylene diisocyanate (TMXDI).

It should be noted that in forming the coating compositions of the present invention mixtures of substituted vinyl dioxolane monomers may be used. Mixtures of aliphatic or aromatic isocyanates and polyisocyanates, as well as mixtures of isocyanate-endcapped aliphatic or aromatic urethane prepolymers, may also be used.

Illustrative of such combinations are mixtures of hexamethylene diisocyanate with polymeric isocyanates derived from hexamethylene diisocyanate and mixtures of hexamethylene diisocyanate with 4,4',4"-tricyclohexylmethane triisocyanate.

Figure 2:
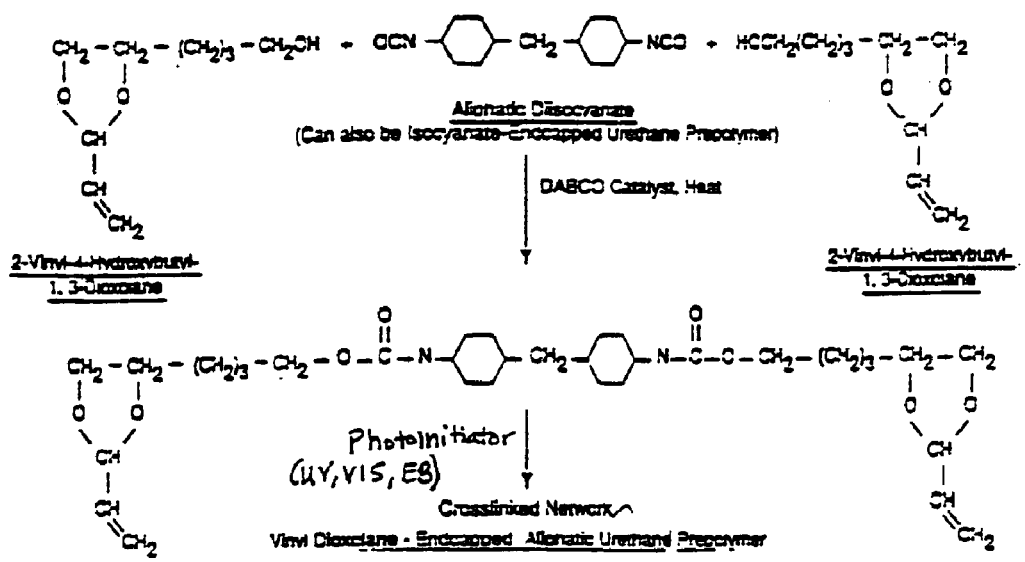
FIG. 2 shows the synthesis of one preferred vinyl dioxolane end-capped polyurethane.

One preferred vinyl dioxolane end-capped polyurethane for use in the present invention is synthesized as shown in FIG. 2.

If any volatile organic components are used in preparation of the reactive vinyl dioxolane end-capped polyurethane oligomers of the present invention, such volatile organic components are readily removed before spraying. However, one major advantage of our invention is that 100% of all reactants initially added to the reaction are consumed in producing the nonvolatile polyurethane/vinyl dioxolane coatings.

The reaction of the vinyl dioxolane and isocyanate or end-capped polyurethane prepolymer to form vinyl dioxomane end-capped polyurethane oligomers of the present invention can be followed by infrared spectroscopy (IR). The IRs give valuable information as to where the peaks of interest lay for each material and with this knowledge the subsequent appearance/disappearance of these peaks can be followed.

Determination of the reactivities of the substituted vinyl dioxolane monomers with aliphatic, aromatic or cycloaliphatic isocyanates or polyisocyanates or isocyanate-endcapped aliphatic or aromatic prepolymers were based on the appearance/disappearance and relative intensity changes of absorption peaks in the infrared spectra of the reaction solutions with time. Infrared spectral analysis systems commercially available may be used. Samples of the substituted vinyl dioxolane monomers and aliphatic, aromatic or cycloaliphatic isocyanate or polyisocyanate or isocyanate-endcapped aliphatic or aromatic prepolymer were placed in a sealed IR cell and the cell could then be handled with no chemical hazard risk to the IR operator.

Comparisons were made between spectra obtained soon after component mixing and at various times during the reaction period. The main peaks of interest appear at 2273 and 1720 to 1690 cm$^{-1}$, assigned to the —N=C=O asymmetric stretch of the isocyanate group and —C=O stretch of a urethane structure, respectively. The disappearance of the peak at 2273 cm$^{-1}$ and appearance of a peak at 1720 to 1690 cm$^{-1}$ is indicative of the isocyanate group undergoing a reaction with the hydroxy group of the vinyl-1,3-dioxolane to form the desired urethane linkage. The relative intensity changes in these peaks can be used to measure the progress of the urethane formation reaction with time. The appearance of an absorption peak at 3330 cm$^{-1}$, due to the =N—H stretch of the urethane linkage, is also used to determine reaction success. The 1,3-dioxolane ring should remain intact throughout all the formations of vinyl dioxolane end-capped polyurethane oligomers of the present invention and can be monitored based on the absorption peaks at 990 and 942 cm$^{-1}$ remaining approximately constant in intensity with time.

Immediately prior to or during the coating process the photoinitiator is added to the vinyl dioxolane end-capped polyurethane oligomers of the present invention. If it is desired to apply the coating composition of the present invention by spray-coating, and the viscosity is too high, reactive diluents as described herein can be added to achieve the desired viscosity for spraying. If it is desired to use the vinyl dioxolane monomer used in preparation of the vinyl dioxolane end-capped polyurethane oligomers as the reactive diluent, an excess of this reactant can be added at the time the vinyl dioxolane end-capped polyurethane oligomers are prepared.

Vinyl dioxolane end-capped polyurethane oligomers of the present invention were prepared using the following aromatic isocyanate: tetramethyl xylene diisocyanate (TMXDI).

The vinyl dioxolane end-capped polyurethane oligomer was evaluated with respect to its effect upon processing and/or properties of the coatings formed in accordance with the present invention.

The infrared spectra for HMVD, HBVD and the isocyanate may be used to determine the progress of the reaction. The vinyl dioxolane peaks of interest can be seen at 3430 cm-1 (—O=H) and at 990 and 942 cm$^{-1}$(—C—O—C stretch), while the isocyanate materials have their main peak of interest at about 2270 cm$^{-1}$, (—N=C=O stretch).

One preferred coating composition of the present invention comprises the vinyl dioxolane end-capped polyurethane oligomers comprising the reaction product of HBVD/TMXDI. The polyurethane/vinyl dioxolane coating obtained by spray coating an aluminum substrate with this coating composition at ambient temperature was colorless and transparent. This polyurethane/vinyl dioxolane based coating cured within minutes at room temperature, when subjected to UV-irradiation.

If it is desired to spray a coating composition in accordance with the present invention and it is determined that the viscosity of the vinyl dioxolane end-capped polyurethane oligomer is too high for spraying, then reactive diluents as described herein can be added. The diluent can be added at from about 1 to 50% by weight, more preferably 1 to 25% by weight and most preferably less than 10% by weight. In other words, the minimum amount to achieve target viscosity while maintaining desired coating properties is added.

It should be noted that reactive diluents can also be used to lower the cost, if the diluents are less expensive than the base coating composition.

Another preferred vinyl dioxolane end-capped oligomer comprises a polyurethane acrylate.

Polyurethane acrylates are commercially available. Some commercially available polyurethane acrylates useful in the practice of the present invention include aliphatic ester-based urethane acrylate oligomers available from Sartomer, Inc.: CN985-B88, CN963-B80, CN964-B85, CN965-A80, CN966-J75. CN985-B88 is a urethane acrylate having a density of 9.625 lbs/gal and a viscosity of 205 cps at 60° C. CN963-B80 is a urethane acrylate having a density of 9.090 lbs/gal and a viscosity of 1100 cps at 60° C. CN964-B85 is a urethane acrylate having a density of 9.100 lbs/gal and a viscosity of 1962 cps at 60° C. CN965-A80 is a urethane acrylate having a density of 8.890 lbs/gal and a viscosity of 1440 cps at 60° C. CN966-J75 is a urethane acrylate having a density of 8.791 lbs/gal and a viscosity of 4240 cps at 60° C.

Alternatively, in accordance with the present invention, the polyurethane acrylates may be synthesized by the reaction of a hydroxy-functional acrylate with at least one of a polyfunctional isocyanate or aliphatic isocyanate-terminated urethane prepolymer.

Polyfunctional branched isocyanates are beneficial in forming the vinyl dioxolane end-capped polyurethane acrylates because such materials have the effect of lowering the composition's viscosity, and, thus, aiding in sprayability of the composition. Further, such materials lead to increased hardness of the cured resin, and improved water and hydraulic fluid resistance. Further, such materials form cured compositions that are easy to remove, when desired, via plastic media blast (PMB) techniques.

Figure 3:
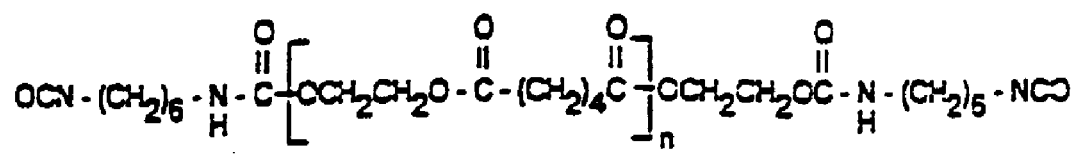
FIG. 3 illustrates an HMDI-terminated, polyethyleneadipate aliphatic urethane prepolymer.

Aliphatic isocyanate-terminated urethane prepolymers have the effect of increasing the length, and consequentially, the molecular weight, of the urethane segment. Increased molecular weight and urethane length improves the toughness, rain erosion-resistance, abrasion-resistance and low temperature flexibility of the cured resin. Such prepolymers may have molecular weights ranging from 500 to 1000. However, as the molecular weight of the polyurethane segment increases, the coating viscosity of the composition also increases. Thus, the molecular weight of the prepolymer, more preferably, ranges from about 500 to 600. One particularly preferred aliphatic isocyanate-terminated urethane prepolymer useful in forming the vinyl-dioxolane end-capped polyurethane acrylate is an HMDI-terminated, polyethyleneadipate aliphatic urethane prepolymer (See FIG. 3).

Preferred photoinitiators include those that are soluble in the monomer, absorb light at the wavelength of selected UV radiation or visible light cure, and then form active species such as radicals that initiate polymerization and cure of the coating resin. For example, some preferred photoinitiators comprise: alpha hydroxy ketones, polymeric hydroxy ketones, trimethylbenzophene, methylbenzophenone, 2 hydroxy-2-ethyl-phenyl-1-propane, phosphine oxide, bis(2, 4,6-trimethylbenzoyl)-phenylphosphineoxide, 1-hydroxy cyclohexyl ketone, benzyl dimethyl ketal, trimethylbenzophenone, benzophenone, bis η⁵-2,4-cyclopentadien-1-yl) bis(2,6-difluoro-3-(1H-pyrrol-1-yl) phenyl) titanium and blends thereof.

Some commercially available photoinitiators useful in the present invention include: Sartomer KIP-100F, Sartomer KT-046, CIBA Darocur 4265, CIBA Irgacur 819, CIBA Irgacur 184, and CIBA Irgacur 784. Sartomer KIP-100F is an alpha hydroxy ketone based photoinitiator comprising a liquid mixture of an oligomeric alpha hydroxy ketone and 2-hydroxy-2-methyl-1-phenyl 1-propanone. More specifically, Sartomer KIP-100F comprises 70 wt % of oligo(2-hydroxy-2-methyl-1-[4-(1-methylvinyl)phenyl] propanone]), (molecular weight n*204.7) and 30 wt % of 2-hydroxy-2-methyl-1-phenyl 1-propanone (molecular weight 164.2). Sartomer KT-046 is a blend of 2,4,6-trimethylbenzoyldiphenylphosphine oxide, alpha-hydroxyketone and benzophenone derivative. CIBA Darocur 4265 comprises 2 hydoxy-2-ethyl-phenyl-1-propane. CIBA Irgacur 819 comprises bis(2,4,6-trimethylbenzoyl)-phenylphosphineoxide and has a molecular weight of 418.5. CIBA Irgacur 184 comprises 1-hydroxy cyclohexyl phenyl ketone and has a molecular weight of 204.3. CIBA Irgacur 784 comprises bis η⁵-2,4-cyclopentadien-1-yl)bis(2,6-difluoro-3-(1H-pyrrol-1 -yl) phenyl)titanium and has a molecular weight of 534.4.

A particularly preferred photoinitiator is an alpha hydroxy ketone based photoinitiator, such as Sartomer KIP-100F. The photoinitiators are added to the radiation curable resin compositions in amounts ranging from about 0.5% to about 10% by weight of the composition. Preferably, the photoinitiators are added in amounts ranging from about 2% to about 6% by weight of the composition, and more preferably, in amounts ranging from about 4% to about 5% by weight of the composition.

For coating applications of the curable resin compositions, it is preferred that the viscosity of the radiation curable resin composition is controlled to render the compositions sprayable. Generally, if a sprayable radiation curable resin composition is desired in accordance with the present invention, the viscosity of the composition is typically about 1000 cps or below.

Obtaining sprayable viscosities may be accomplished by selecting the appropriate combination of vinyl dioxolane monomer, oligomer and photoinitiator. For example, the molecular weight of the oligomer is taken into consideration. Lower molecular weight oligomers generally have associated lower viscosities. In addition, the viscosity of vinyl dioxolane is taken into consideration, as well as the degree of cross-linking that the particular vinyl dioxolane is likely to provide. For example, coating compositions of the present invention prepared from HMVD tend to be higher in viscosity than similar formulations prepared using HBVD, even though HMVD is lower in viscosity than HBVD. It is believed that the higher viscosity of HMVD end-capped oligomers of the present invention results from increased cross-linking provided by the smaller HMVD molecule.

Sprayable viscosities of the curable resin compositions may also be achieved by adding reactive diluents to the curable resin compositions. Reactive diluents suitable in the practice of the present invention generally possess the following properties: low viscosity; low volatility; presence of functional groups similar in reactivity to those attached to the vinyl dioxolane monomer so that the diluent is compatible with the catalyst formulation; and does not adversely effect properties of the cured resin. In addition, the reactive diluent is compatible with the radiation curability of the resin composition. Reactive diluents particularly useful in obtaining sprayable resin viscosities generally have a viscosity from about 10 to about 100 mPa·s at about 23° C.

Some examples of preferred reactive diluents include vinyl dioxolanes, such as unsubstituted and monosubstituted vinyl dioxolane monomers such as HMVD and HBVD, methyl ether derivatives of HMVD and HBVD, unsubstituted vinyl dioxolane, allylated vinyl dioxolane, diethylene glycol diacrylate (DGD), tetrahydrofurfuryl acrylate, 2-phenoxyethyl acrylate, isooctyl acrylate, propoxylated neopentyl glycol diacrylate, lauryl acrylate, triethyleneglycol diacrylate, hexanediol diacrylate, polyester vinyl dioxolane (PEVD), and trimethylopropane triacrylate (TMPTA).

In the practice of the present invention, DGD is a particularly preferred diluent. Also particularly useful as a reactive diluent are vinyl dioxolane monomers, since they may be incorporated simply by the addition of an excess of the vinyl dioxolane monomer during the reaction between the vinyl dioxolane and the PCL oligomer end-capped with functional groups.

The reactive diluent is present in the curable resin in amounts up to about 50% by weight of the composition. More preferably, the reactive diluent is present up to about 25% by weight of the composition, and even more preferably up to about 10% by weight of the composition.

Table 2 summarizes some pertinent properties of some reactive diluents

TABLE 2

Properties of Reactive Diluents

| MONOMER/SUPPLIER | VISCOSITY at 23° C., mPa.s |
|---|---|
| Tetrahydrofurfuryl acrylate (Sartomer SR-285) | 6 |
| Lauryl acrylate (Sartomer SR-335) | 6 |
| 2-Phenoxyethyl Acrylate (Sartomer SR-339) | 5 |
| Isooctyl acrylate (Sartomer SR-339) | 5 |
| Diethylene glycol diacrylate (Sartomer SR-230) | 15 |
| Propoxylated neopentyl glycol diacrylate (SR-9003) | 12 |
| TMPTA (Aldrich) | 74 |
| HMVD (Degussa) | 23 |

In some embodiments, when desired, the radiation curable resin composition further comprises at least one pigment, such as titanium dioxide and carbon black. These pigments are preferably added in amounts ranging from about 0.1% to about 30% by weight of the composition, so as to impart a color on the composition but not interfere with the radiation curability, hardness or other properties of the radiation curable resin composition.

In some embodiments, when pigments are added, photoinitiators having a higher absorption band than the pigments are required. For example, when adding titanium dioxide or carbon black, the photoinitiator should have an optimum absorption of at least 360 nm. For example, preferred photoinitiator for use with pigmented resin compositions include Sartomer KT-046, CIBA Irgacur 819, CIBA Darocur 4265 and blends thereof.

In some embodiments, when desired, the radiation curable resin composition further comprises processing aids, which may to contribute to the development of a smoother, more adherent and defect free cured resin. Some useful processing aids may include wetting agents, coupling agent, adhesion promoters, co-initiators, and thixotropic agents.

Wetting agents are surfactants that are particularly useful for coating compositions because they improve the composition's ability to "wet" and coat the substrate surface. When added in appropriate amounts, of up to about 0.5 weight percent, wetting agents can significantly improve the ability of a coating to release bubbles, flatten out on the surface and cure to a smooth, glossy surface.

Figure 4:
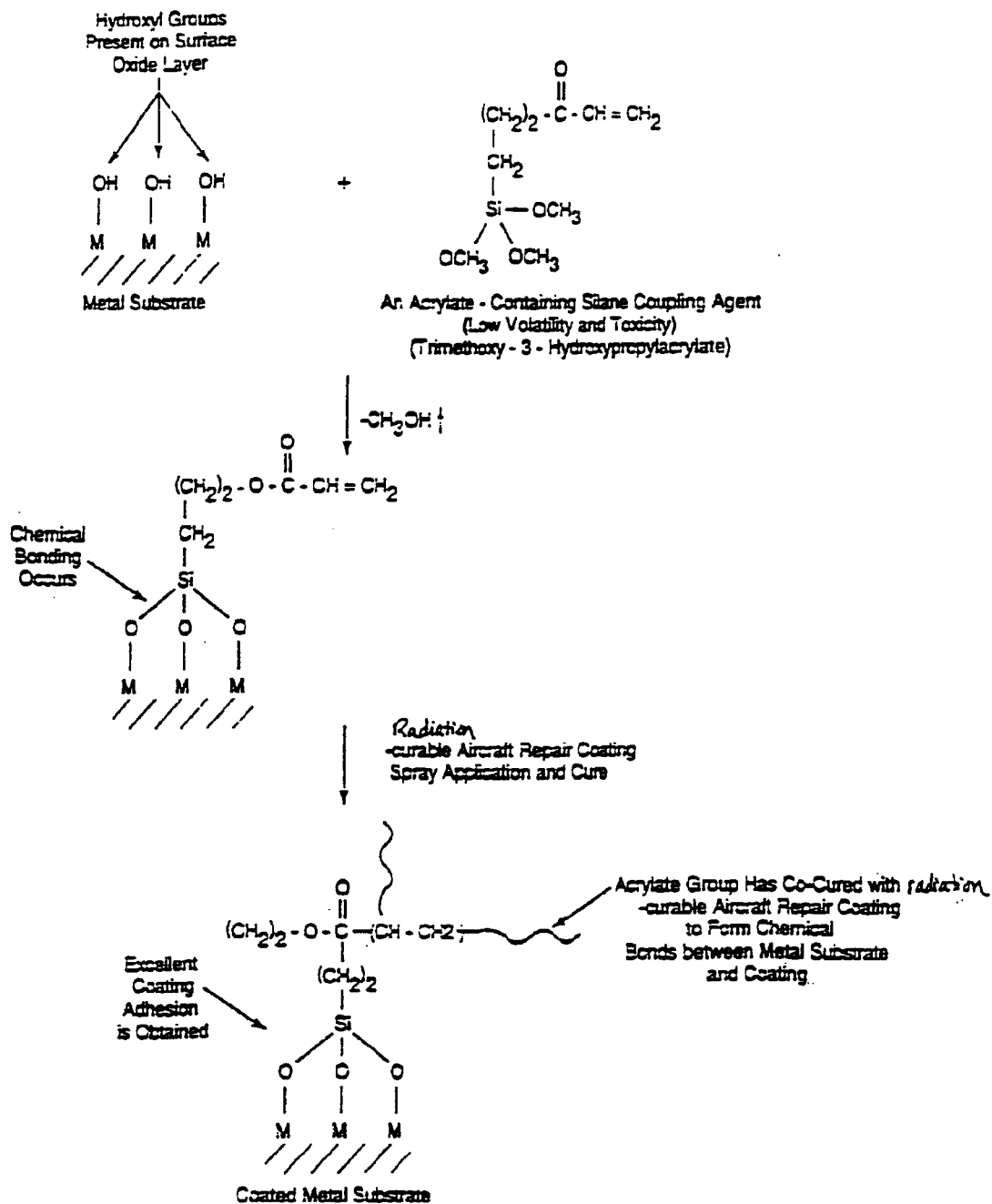
FIG. 4 illustrates the mechanism by which a silane coupling agent can be used to improve the adhesion properties of the compositions.

Coupling agents are multifunctional chemical reagents that are typically added to coatings to improve the wetout and adhesion to a substrate surface. Usually, the coupling agent is applied to the substrate before application of the coating. There, it bonds chemically through one of its two different functional groups to hydroxyl groups usually present on the metal surface oxide layer. Occasionally however, the coupling agent is added to the coating formulation, where it migrates to and reacts with the substrate surface. When the coating is dried, the second functional group present on the coupling agent co-cures along with the coating, forming a strong covalent bond between coating and substrate. The overall result of using a coupling agent is a more durable, tightly-bonded coating on the metal substrate. FIG. 4 illustrates the mechanism by which a silane coupling agent can be used to improve the bonding of UV-curable coatings to both pigment particles and metallic substrates. These coupling agents may be added in amounts of up to about 1.5 weight percent.

Thixotropic agents, such as fumed silica, are added to coating formulations to improve their resistance to running when applied to vertical surfaces. While the coating material containing this additive is sheared, such as in spray-coating, viscosity remains low and the coating is easily sprayed. Immediately upon cessation of shear however, such as when the coating reaches and covers the substrate surface, a molecular network forms causing the coating to set-up and remain in place on the vertical surface while the curing process begins. These thixotropic agents may be added in amounts of up to about 10 weight percent.

Adhesion promoters, such as those known in the art, may further be added to the radiation curable resin composition to enhance the cured resin's adhesion to a substrate. A metallic diacrylate based adhesion promoter, such as Sartomer SR 706 is particularly useful in the present invention. These adhesion promoters may be added in amounts of up to about 15 wt %.

Co-initiators may further be added to the radiation curable resin composition to accelerate cure of the composition and to improve cured coating properties. Some suitable co-initiators include reactive amines, such as Sartomer CN381, Sartomer CN384 and Sartomer CN386. These co-initiators may be added in amounts of up to about 5 wt %.

The coating composition blends of the present invention will be illustrated by the formula of a polyester prepolymer prepared by the reaction of HMVD or HBVD with dimethyl 1,4-cyclohexanedicarboxylate and the formation of a polyurethane prepolymer prepared by the reaction of TMXDI in the presence of at least one catalyst. However, it is not intended to limit the scope of the coating compositions of the present invention to these components.

Reaction conditions were adjusted to maximize the formation of the PEVD and PUVD prepolymers while minimizing unwanted and undesirable side-reactions. The most deterious side-reaction is the opening of the dioxolane ring system at elevated temperatures, resulting in the formation of free radicals which can induce cross-linking via the pendant vinyl groups and cause gelation of the prepolymers. Introduction of color into the prepolymer by thermal degradation of the reactants or the PEVD and PUVD prepolymer is an undesirable side-reaction because of the intended use of the PEVD/PUVD coating compositions of the present invention as a clear and colorless topcoat. Thus, the length of time the reaction is carried out at elevated temperatures as well as the maximum reaction temperature is kept to a minimum.

Most chemical reactions involve an equilibrium situation where the reaction combining reactants to form products (i) is in competition with the decomposition reaction of the product into reactants (ii). with product formation being slightly favored. One way to assist the formation of PEVD and PUVD is to generate a reaction byproduct which can be removed from the reactoin environment and shift this equilibrium situation to favor product formation (i).

When the PEVD prepolymer produced by an ester interchange reaction involving replacing, for example, the methoxy groups of dimethyl 1,4-cyclohexanedicarboxylate with methoxy vinyl dioxolane groups, methanol is evolved as a reaction byproduct. Methanol can be distilled from the reaction apparatus as its toluene azeotrope at the elevated reaction temperatures used.

The coating compositions of the present invention can be used as clear, unpigmented coating compositions, or they can be pigmented, using proportions well known in the art, with pigments such as titanium dioxide and carbon black.

The clear unpigmented compositions of this invention can be made by simply mixing the ingredients as taught in the present specification. When pigmentation is involved, a conventional pigment grinding or dispersing step is generally required. The curable resin compositions of this invention are particularly useful as coatings in the following areas: automotive, commercial and military aircraft, navy and commercial ships, transportation vehicles, industrial structures, electronics, spacecraft, and household. The coatings of the present invention are applied by spraying followed by UV, visible light or electron beam cure at ordinary room or atmospheric temperature or by force-drying at a convenient temperature above ambient temperature but below a temperature which decomposition or some other objectionable results occur or a combination of both.

The coating compositions of the present invention are preferable applied by spraying, including airless and electrostatic spraying.

In one preferred embodiment, the radiation curable resin composition is used to repair an aircraft by a procedure such as the following: strip the damaged area of the aircraft to bare metal; apply a non-chromate conversion coating, preferably by spraying; apply a non-chromate conversion coating primer, preferably by spraying; apply the radiation curable resin composition, preferably by spraying; cure the resin composition by either a visible or UV source range.

The coating compositions and coatings of the present invention will be further illustrated with reference to the following Examples which are intended to aid in the understanding of the present invention, but which are not to be construed as a limitation thereof.

EXAMPLES

Materials:

Metal substrates were primed or unprimed 3 in.×5 in. steel (low carbon, cold-rolled, SAE 1010) or 4 in.×6 in. aluminum ("yellow chromated" 2024-T3 alloy) panels from Q-Panel Lab Products, Cleveland, Ohio.

TMXDI was obtained from Aldrich Chemical Company.

General PUVD Synthesis:

Conventional laboratory apparatus may be used to prepare PUVD coating material from the reaction of hydroxy-substituted vinyl dioxolane with an appropriate diisocyanate.

The ratio of vinyl dioxolane to isocyanate during synthesis of vinyl dioxolane end-capped polyurethane oligomers of the present invention is determined by the free-NCO content of the isocyanate. Unless otherwise specified, one free-NCO is reacted with each hydroxy methyl substituent on the reactive vinyl dioxolane. The percent of photoinitiator is based on the combined weight of the vinyl dioxolane and isocyanate components.

A typical experimental procedure used for the preparation of PUVD coating material is as follows:

Working in a glovebag under nitrogen, the appropriate amount of vinyl dioxolane end-capped polyurethane oligomers and polymerization catalyst are weighted out into a three-neck flask equipped with a nitrogen inlet and mechanical stirrer. The appropriate amount of aliphatic, aromatic or cycloaliphatic isocyanate or polyisocyanate or isocyanate-endcapped aliphatic or aromatic prepolymer is weighed out into a slow-drip funnel.

After assembling the reaction vessel inside the glovebag, it is removed and set up inside a laminar flow hood and purged with nitrogen. The slow-drip funnel is removed from the glovebag and attached to the reaction vessel.

The reaction vessel is lowered into an oil bath which has been preheated to the selected reaction temperature. The drip funnel is opened and the aliphatic, aromatic or cycloaliphatic isocyanate or polyisocyanate or isocyanate-endcapped aliphatic or aromatic prepolymer is slowly added to the reaction vessel over a period of 1 hour. The reaction mixture is stirred under a positive nitrogen atmosphere and is monitored closely for changes in viscosity or appearance.

Using a sealed IR cell, an IR spectra of the reaction mixture is obtained as soon as all of the aliphatic, aromatic or cycloaliphatic isocyanate or polyisocyanate or isocyanate-endcapped aliphatic or aromatic prepolymer has been added. Thereafter, IR spectra of the reaction mixture is obtained every hour or whenever a significant viscosity or appearance change occurs.

The progress of the reaction is monitored by the disappearance of the —N=C=O isocyanate stretch at 2270 $cm^{-1}$ and the appearance of the urethane —C=O and =N—H stretches at 1690 $cm^{-1}$ and 3330 $cm^{-1}$ respectively.

The reaction is complete when the —N=C=O stretch has completely disappeared, coinciding with sharp —C=O and =N—H peaks.

At this point, all of the reaction mixture is transferred to a container and stored for use in preparing the coating compositions of the present invention.

Reaction of 2-vinyl-4hydroxybutyl-1,3-dioxolane (HBVD) with TMXDI

The general PUVD syntheses procedure set out above was followed, using HBVD (29.45 g), TMXDI (20.75 g) and DABCO -1,4 Diazabicyclo 2,2,2 octane polymerization catalyst (0.1 g). The oil bath is preheated to about 40° C.

If desired, multiple quantities of these components may also be used, with the ratios of the components remaining about the same.

Reaction of 2-vinyl-4hydroxymethyl-1,3-dioxolane (HMVD) with TMXDI

The general PUVD syntheses procedure set out above was followed, using HMVD (25.99g), TMXDI (24.21 g) and DABCO-1,4 Diazabicyclo 2,2,2 octane polymerization catalyst (0.1 g). The oil bath is preheated to about 40° C.

If desired, multiple quantities of these components may also be used, with the ratios of the components remaining about the same.

PUVD Characterization

Determination of the reactivity of the diisocyanate with vinyldioxolane were based on the appearance/disappearance and relative intensity changes of absorption peaks in the infrared spectra of the reaction solutions with time. Samples of the PTVD coating material were placed in a sealed IR cell and the cell could then be handled with no chemical hazard risk to the IR operator. Comparisons were made between spectra obtained soon after reactant mixing and at various times during the reaction period. The main peaks of interest appear at 2273 and 1720 to 1690 $cm^{-1}$, assigned to the—N=C=O asymmetric stretch of the isocyanate group and —C=O stretch of a urethane structure, respectively. The disappearance of the peak at 2273 $cm^{-1}$ and appearance of a peak at 1720 to 1690 $cm^{-1}$ is indicative of the isocyanate group undergoing a reaction with the hydroxy group of the vinyl dioxolane to form the desired urethane linkage. The relative intensity changes in these peaks can be used to measure the progress of the urethane formation reaction with time. The appearance of an absorption peak at 3330 $cm^{-1}$ due to the =N—H stretch of the urethane linkage, is also used to determine reaction success. The 1,3-dioxolane ring should remain intact throughout all the reactions and can be monitored based on the absorption peaks at 990 and 942 $cm^{-1}$ remaining approximately constant in intensity with time.

General PEVD Synthesis

Conventional laboratory apparatus may be used to prepare PEVD coating material from the reaction of hydroxy-substituted vinyl dioxolane with an appropriate ester of a polycarboxylic acid. A typical experimental procedure used for the preparation of PEVD coating material is as follows:

Working in a glovebag under nitrogen, the appropriate amount of vinyl dioxolane end-capped polyester oligomers and polymerization catalyst are weighted out into a three-neck flask equipped with a nitrogen inlet and mechanical stirrer. The appropriate amount of the ester of a polycarboxylic acid is weighed out into a slow-drip funnel.

After assembling the reaction vessel inside the glovebag, it is removed and set up inside a laminar flow hood and purged with nitrogen. The slow-drip funnel is removed from the glovebag and attached to the reaction vessel.

The reaction vessel is lowered into an oil bath which has been preheated to the selected reaction temperature. The drip funnel is opened and the ester of a polycarboxylic acid is slowly added to the reaction vessel over a period of 1 hour. The reaction mixture is stirred under a positive nitrogen atmosphere and is monitored closely for changes in viscosity or appearance.

Using a sealed IR cell, an IR spectra of the reaction mixture is obtained as soon as all of the ester of a polycarboxylic acid has been added. Thereafter, IR spectra of the reaction mixture is obtained every hour or whenever a significant viscosity or appearance change occurs.

The IR spectrum of the dispersion residue is obtained and analyzed for the absence of hydroxyl groups (the —OH stretch of HMVD appears at 3433 cm$^{-1}$) and retention of ester (the C=O stretch of aliphatic esters appear at 1750 to 1735 cm$^{-1}$), vinyl (the =CH$_2$ $\delta_{ip}$ appears at 1438 cm$^{-1}$) and dioxolane (—C—O—C— ring stretch appear at 984 and 943 cm$^{-1}$) groups.

It is the disappearance of the pronounced absorption of HMVD at 3433 cm$^{-1}$ as HMVD becomes attached to the ester of a polycarboxylic acid, forming the ester linkage, that was used to monitor the progress of the reaction At the completion of the reaction, all of the reaction mixture is transferred to a container and stored for use in preparing the coating compositions of the present invention PEVD Characterization IR spectroscopy and TLC were used to characterize the PEVD prepolymer. TLC indicated the presence of reactants in the prepolymer as well as its purity, considered purified if only one spot appeared on the TLC plate upon exposure. A Boemem Michaelson FTIR spectrometer operating from 4000 to 600 cm$^{-1}$ was used to monitor the progress of the PEVD prepolymer synthesis and determine its chemical structure. IR spectra were obtained using a sodium chloride IR disk coated with either the reaction dispersion residue or PEVD. $^1$H— and $^{13}$C— nuclear magnetic resonance (NMR) spectroscopy was performed on a sample of PEVD prepolymer dissolved in deuterated chloroform using a 300 MHz Varian FT-NMR located at Brandeis University, Waltham, Mass. The chemical structural determination of PEVD from its IR and NMR spectra is discussed below.

Figure 5:
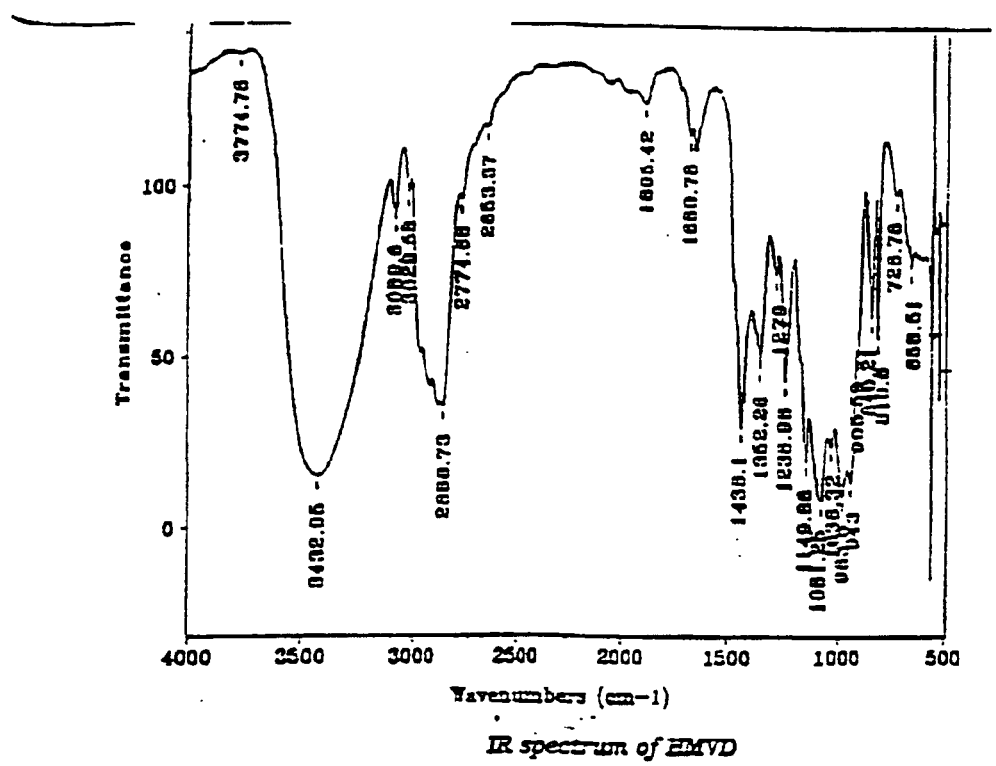
FIG. 5 shows the IR spectra of 2-vinyl-4-hydroxymethyl-1,3-dioxolane (HMVD).
Figure 6:
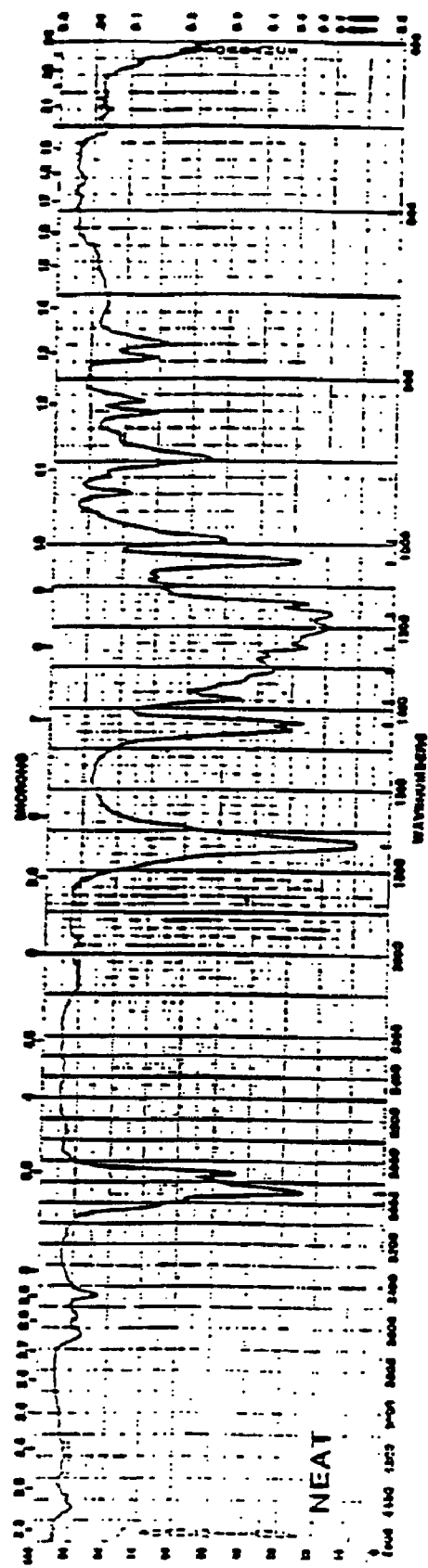
FIG. 6 shows the IR spectra of dimethyl 1,4-cyclohexanedicarboxylate.

The progress of the synthesis reaction was monitored by observing changes in the IR spectrum of HMVD, while verifying other portions of the HMVD and dimethyl 1,4-cyclohexanedicarboxylate spectra remained unchanged. The absorption peaks of interest consisted of the dimethyl 1,4-cyclohexanedicarboxylate ester —C(O)O—] and HMVD hydroxyl (—OH), vinyl (H$_2$C=CH—) and dioxolane ring (—C—O—C—). Absorption peak assignments were made based on the IR spectra of similar known compounds and spectral data tables. The absorption attributed to the —OH stretch of HMVD appears at 3433 cm$^{-1}$ while absorptions typical for dioxolane ring (—C—O—C—) stretch appear at 984 and 943 cm$^{-1}$ (FIG. 5) (Fresenius, W.; Huber, J. F. K.; Pungor, E.; Rechnitx, G. A.; Simon, W.; West, Ths.S., *Tables of Spectral Data for Structure Determination of Organic Compounds*, 2nd edition, Springer-Verlag, N.Y., 1989). Absorptions assigned to the C=O stretch of aliphatic esters appear at 1750 to 1735 cm$^{-1}$ (Fresenius, W. et al., supra). with dimethyl 1,4-cyclohoexanedicarboxylate having an absorption at 1734 cm$^{-1}$ (FIG. 4) (Pouchert, C. J., *The Aldrich Library of FT-IR Spectra*, edition 1, Aldrich Chemical Company, Inc., WI, 1985). This is sufficient spectral data to allow the monitoring of the progression of PEVD formation.

It is the disappearance of the pronounced absorption of HMVD at 3433 cm$^{-1}$ as HMVD becomes attached to the dimethyl 1,4-cyclohexanedicarboxylate unit, forming the ester linkage, that was used to monitor the progress of the reaction. The displaced methoxy groups are converted into methanol under the reaction conditions, are distilled as a methanol/toluene azeotrope out of the reaction solution into the Dean-Stark trap, removed via the stopcock at the trap bottom, and the azeotrope volume measured using a graduated cylinder. Azeotrope distillation was confirmed by IR spectroscopy and boiling point, occurring at 63.7° C. rather than 64.7° C. (methanol) or 110.6° C. (toluene) (Weast, R. C., *Handbook of Chemistry and Physics*, 49th edition, The Chemical Rubber Co., Cleveland, Ohio, 1968). The amount of evolved methanol can be calculated from the azeotrope volume and its reported composition (Weast, R. C., supra). IR spectroscopy was also used to confirm the retention of other functional groups in PEVD initially present in HMVD, the dioxolane ring (—C—O—C— absorptions at 984 and 943 cm$^{-1}$) and vinyl (=CH$_2\delta_{ip}$ absorption at 1438 cm$^{-1}$). Reformation of the ester linkage [—C(O)O—] was confirmed by the observation of an absorption at 1732 cm$^{-1}$, attributed to the C=O stretch.

Figure 7:
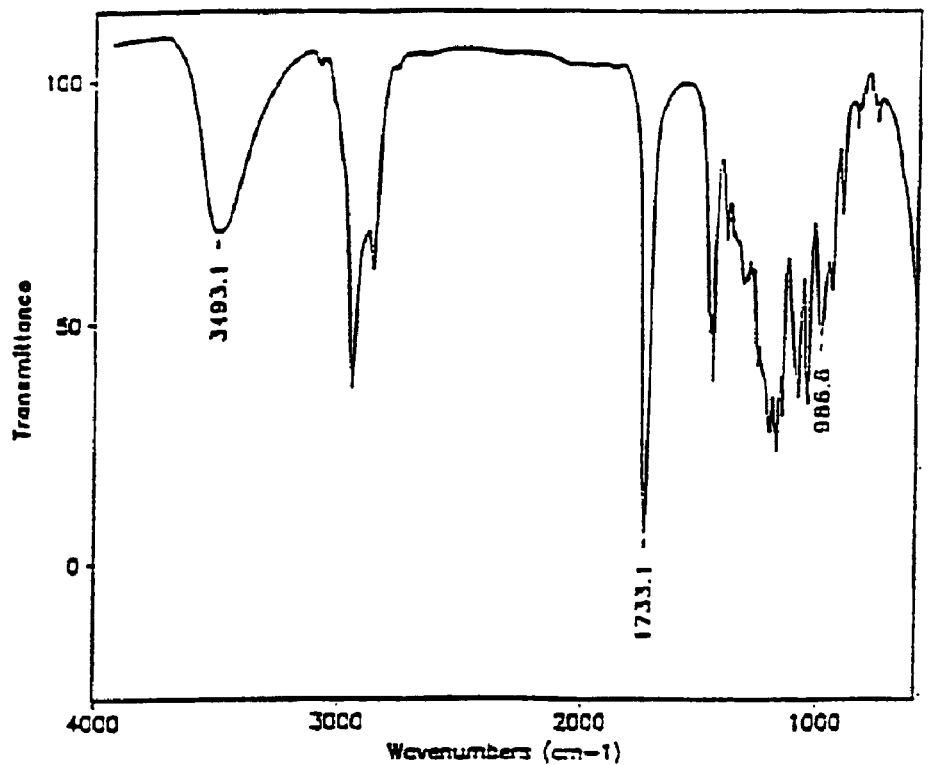
FIG. 7 shows the IR spectra of the reaction dispersion prior to any prepolymer formation.
Figure 8:
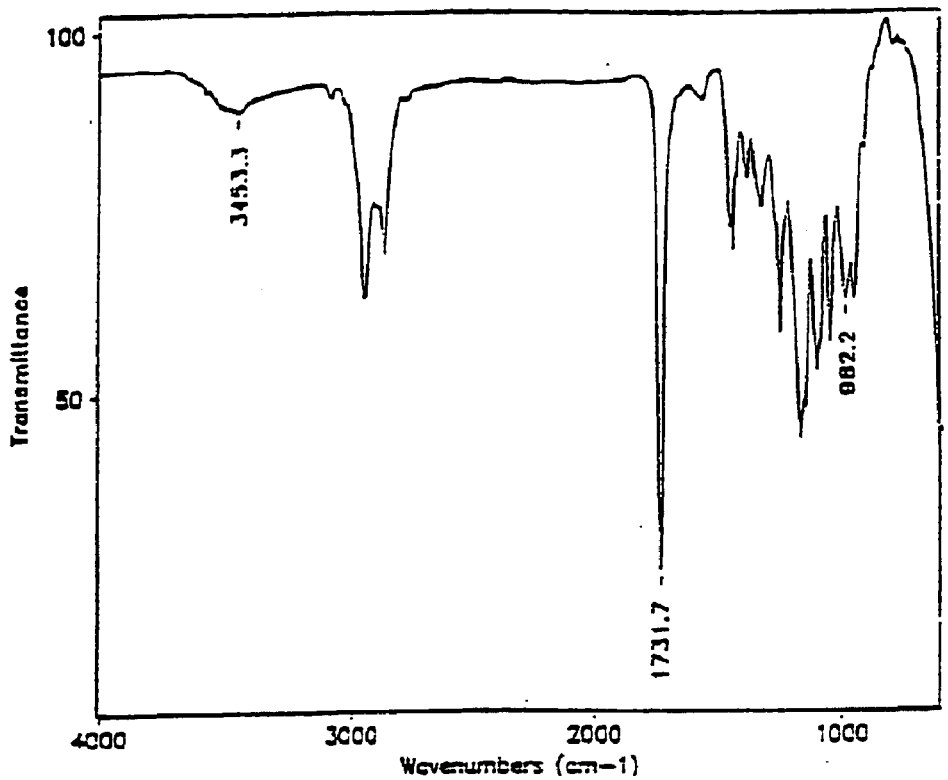
FIG. 8 shows the IR spectra of the reaction dispersion AFTER appreciable amounts of PEVD prepolymer has formedation.

The IR spectrum of the reaction dispersion prior to any prepolymer formation (FIG. 7) showed absorptions at 3493 (—OH), 1733 (C=O), 987 (—C—O—C—) and 940 (—C—O—C—) cm$^{-1}$, indicating that both reactants are present. The catalyst was then added and the reaction temperature gradually increased until methanol/toluene azeotrope distillation began. The reaction temperature was maintained at 100 to 125° C. for approximately 5 hours until azeotrope distillation ceased. After allowing the reaction to proceed almost to completion, the IR spectrum of the reaction dispersion had lost the —OH absorption at 3490 cm$^{-1}$ while maintaining an ester C=O absorption at 1732 cm$^{-1}$ and vinyl dioxolane absorptions at 1483, 982 and 940 cm$^{-1}$, indicating the dioxolane ring and pendant vinyl groups are still intact at the end of the reaction (FIG. 8). The reaction temperature was increased to 140 to 155° C. for approximately 2 hours to ensure the reaction had gone to completion and then cooled to ambient temperatures. The time the reactants and PEVD prepolymer are exposed to elevated temperatures must be minimized in order to avoid undesirable side-reactions that generate color and cross-links which result in gelation. The completeness of the reaction was confirmed by thin layer chromatography (TLC) and IR spectroscopy.

Figure 9:
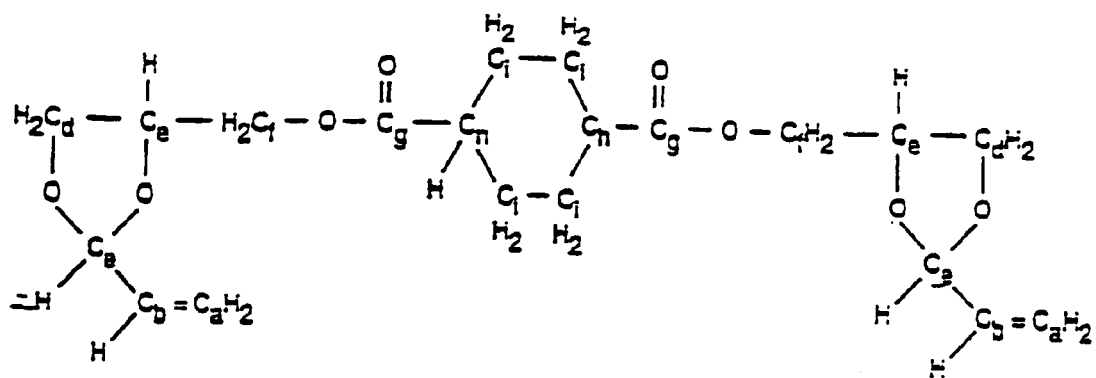
FIG. 9 shows the chemical structure of PEVD prepolymer labeled for NMR analysis.
Figure 10:
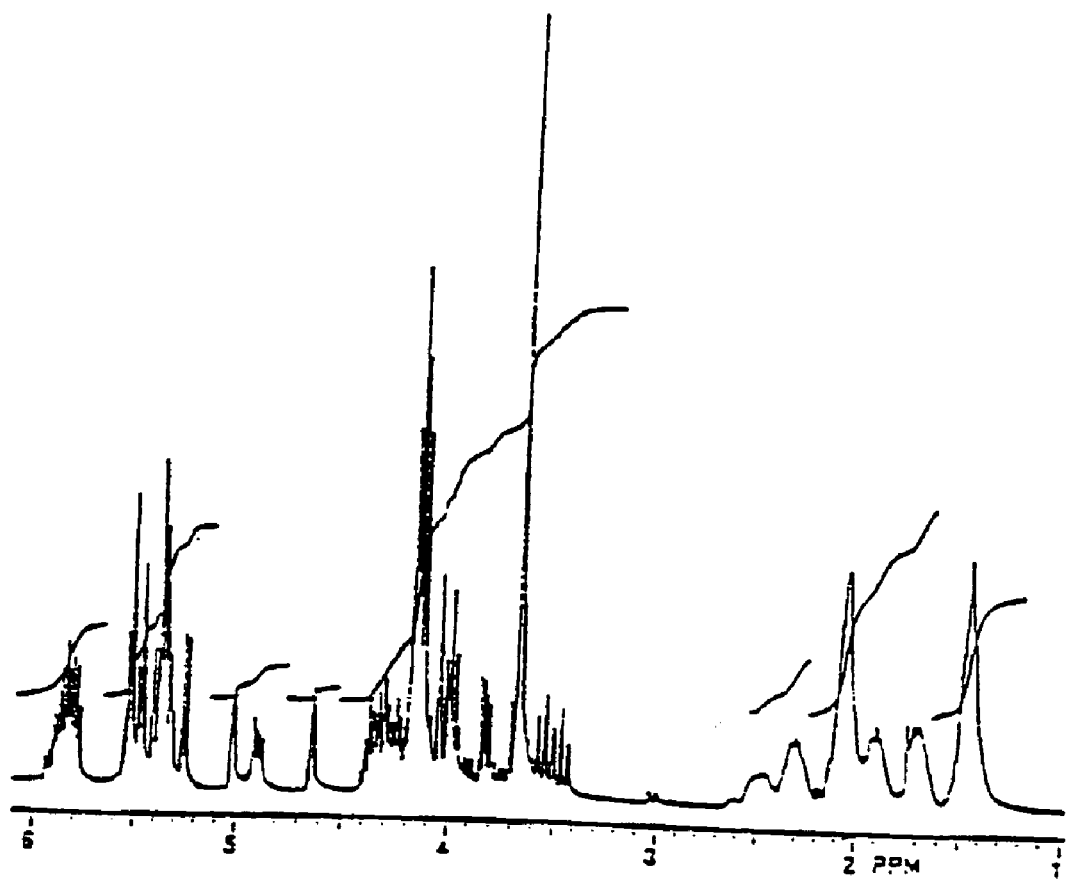
FIG. 10 shows the HNMR spectrum of purified PEVD prepolymer.
Figure 11:
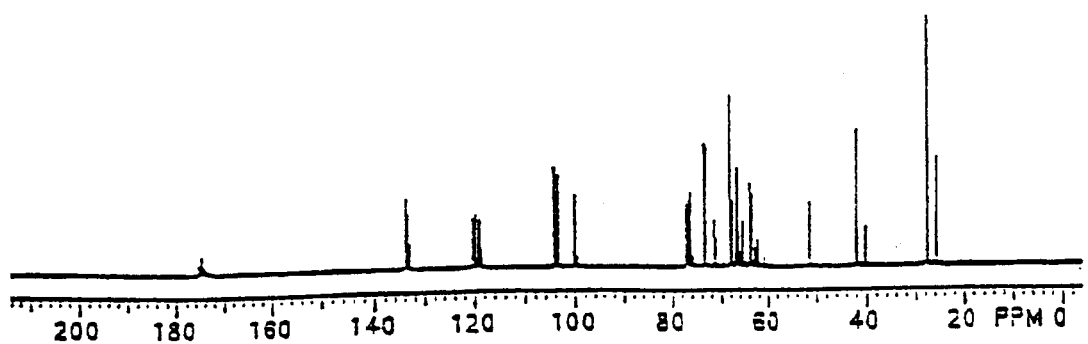
FIG. 11 shows the CNMR spectrum of purified PEVD prepolymer

$^1$H— and $^{13}$C— nuclear magnetic resonance (NMR) spectroscopy were performed on a sample of the HMVD/dimethyl 1,4-cyclohexanedicarboxylate PEVD prepolymer dissolved in deuterated chloroform using a 300 MHz Varian FT-NMR. The spectra are complicated due to the presence of impurities and isomers in both HMVD and dimethyl 1,4-cyclohexanedicarboxylate. Assignment of each absorption peak to a structural unit in the PEVD prepolymer (FIG. 9) was not done. The $^1$HNMR spectrum (FIG. 10) contains numerous absorption peaks which have been separated into regions as listed in Table 3. Comparison of the intensity of the 5.95–5.75 and 5.60–5.29 ppm vinyl group regions (1.5+3.1=4.6 intensity) to that of the 2.70–1.30 ppm C$_1$ region of the cyclohexyl group (eight intensity) suggests not every methoxy group of dimethyl 1,4-cyclohexanedicarboxylate has been replaced by hydroxymethyl vinyl dioxolane groups. This conclusion is supported by the $^{13}$CNMR spectrum of PEVD (FIG. 11) which shows an absorption at 51.4 ppm, a value typical for methoxy esters (Fresenius, W. et al., supra). The presence of ester linkages [—C(O)O—], vinyl groups (H$_2$C=CH—), dioxolane and cyclohexyl ring systems in PEVD is indicated based on the $^{13}$CNMR spectrum as listed in Table 4 (Fresenius, W., et al., supra)). NMR data generally support the proposed chemical structure of PEVD, but also indicate complete replacement of methoxy groups by hydroxymethyl vinyl dioxolane groups has not occurred.

Prepolymer synthesis conditions can be modified, if desired, to obtain more complete conversion to the PEVD prepolymer by altering the reaction conditions, e.g., to increase the activity of the polymer, by removing by-products, and other alterations that will be apparent to the skilled artisan.

TABLE 3

¹HNMR spectral data and assignment

| Absorption Peak (ppm) | Experimental Peak Intensity Ratio | Theoretical Peak Intensity Ratio | Assignment |
|---|---|---|---|
| 5.95–5.75 | 1.5 | 2 | H on $C_b$ of vinyl group |
| 5.60–5.29 | 3.1 | 4 | Hs on $C_a$ of vinyl group |
| 5.28–5.23 | 0.5 | — | — |
| 5.04–4.98 | 0.4 | — | — |
| 4.95–4.85 | 0.4 | — | — |
| 4.63 | 0.4 | — | — |
| 4.41–3.40 | 8.1 | — | — |
| 2.70–1.30 | 8.0 | 8 | Hs on $C_i$ of cyclohexyl group |

TABLE 4

¹³CNMR spectral data and assignment

| Absorption Peak (ppm) | Assignment |
|---|---|
| 175.6–174.5 | $C_g$: carbonyl group |
| 134.0–133.5 | $C_b$: carbon of vinyl group |
| 120.7–119.1 | $C_a$: carbon of vinyl group |
| 140.4–99.9 | $C_c$: dioxolane ring carbon |
| 76.1–61.6 | $C_{d,e,f}$: dioxolane ring carbons |
| 51.4 | Carbon of methoxy group |
| 42.3–40.5 | $C_h$: carbons of cyclohexyl group |
| 28.0–25.9 | $C_i$: carbons of cyclohexyl group |

Coating Procedures

Both bare and chromated aluminum test-panels may be used as indicated in the following examples. A typical procedure for preparation of hand-coated test panels is as follows:

Wipe clean all panels using acetone and place cleaned panels in an oven at 100° C. for 1 hour.

Remove panels from oven and place Scotch Tape around the perimeter of each panel to act as a shim to set the coating thickness. Take care to avoid trapping air bubbles when placing the tape down as this will lead to nonuniform coating thicknesses.

Mix the appropriate amount of photoinitiator with the vinyl dioxolane end-capped polyurethane, polyester or polyurethane acrylate oligomers of the present invention and stir for at least 1 minute to ensure uniform mixing of the thus obtained coating composition.

Place an appropriate amount of the coating compositions on the panel to be coated and use a glass slide to spread the coating compositions across the panel.

Enable radiation cure at room temperature by either visible light, UV or electron beam irradiation. For cure under UV irradiation, substrates are placed in an UV chamber (such as Fusion UV Systems, F300S-6) with an H bulb (spectral output between about 210–310 nm) and the effect of time of UV exposure on cure are studied.

The apparatus used to prepare spray-coated samples of coating compositions of the present invention on aluminum test panels may be a conventional spray apparatus which is capable of heating the coating composition if desired. Both bare and chromated aluminum test panels may be used in these experiments. A typical procedure for preparation of the test panels spray-coated with coating compositions of the present invention follows:

Wipe clean all panels using acetone and place cleaned panels in an oven at 100° C. for 1 hour.

Mix the appropriate amount of photoinitiator to a composition comprising at least one vinyl dioxolane end-capped polyurethane, polyester or polyurethane acrylate oligomer of the present invention and stir for at least 1 minute to ensure uniform mixing.

Place the thus formed coating composition into a beaker and place the beaker inside a spray canister. Oil may be placed inside the canister to fill around the outside of the beaker and may be heated to a selected temperature by means of heater bands wrapped around the outside of the spray canister. In some cases it is desirable to heat the coating compositions of the present invention to lower the viscosity of the coating composition to facilitate the spraying.

Attach an air line to the canister, ensuring that the air line has an oil and moisture trap.

Spray apply the coating compositions of the present invention.

Enable radiation cure at room temperature by either visible light, UV or electron beam irradiation. For cure under UV irradiation, substrates are placed in an UV chamber (such as Fusion UV Systems, F300S-6) with an H bulb (spectral output between about 210–310 nm) and the effect of time of UV exposure on cure are studied.

Testing Procedure

The time required for a hard cure and the cured resin's surface appearance were observed during the experiments. In addition, the properties of the cured coatings were evaluated based on military specification (MIL-PRF-85285C). The following tests were carried out:

1. Adhesion- ASTMD3359-78.
2. Hardness- Pencil Test, ASTM D-3363-92a.
3. Solvent Resistance: MEK Resistance: 25 double rubs
4. Fluid Resistance: 24 hours exposure to 5606 hydraulic fluid, JP-A jet fuel and 30w motor oil.

TABLE 5

Requirements for Advanced Aircraft Coatings

| PROPERTY | REQUIREMENT |
|---|---|
| Volatile Organic Components (VOCs) Present | 40 to 50% Non photochemically active |
| Color | 595 chip |
| Gloss | 90 minimum |
| Wet Tape Adhesion | No delamination |
| Salt Spray-Resistance | No blistering or corrosion |
| Humidity-Resistance | No blistering |
| Heat-Resistance | 300° F./4 hours without damage |
| Low Temperature Flexibility | Bend over 1 inch radius at −55 deg. without crazing |
| Hydraulic Fluid-Resistance | Less than 2 pencil units loss in hardness |
| Impact Flexibility | No crazing after 24 in. drop height impact |
| Weathering-Resistance | Less than 10 percent loss in gloss No cracking |
| Pencil Hardness | At least H-2H hardness |

Example 1

The effect of photoinitiator concentration on cure time and coating properties was studied in connection with PUVD (as formed by reacting TMXDI with HBVD). Sartomer KIP-100F, an alpha hydroxy ketone based photoinitiator that has high reactivity and low volatility was used in the experiments. The reactive diluent, diethylene glycol diacrylate (Sartomer SR-230) was added to lower the viscosity in some formulations. The cure results are set out below in Table 6.

TABLE 6

Effect of UV Exposure Time

| Formulation | UV Exposure Time (sec) | Adhesion ASTMD-3359-78. | Hardness ASTMD-3363-92a. |
|---|---|---|---|
| PUVD(95%)/KIP100F (5%) | 39 | 5 | 5B |
| PUVD(95%)/KIP100F (5%) | 62 | 1 | HB |
| PUVD(95%)/KIP100F (5%) | 126 | 1 | H |
| PUVD(95%)/KIP100F (5%) | 250 | Failed | 2H |
| PUVD(90%)/SR-230 (5%)/KIP100F (5%) | 39 | 5 | 2B |
| PUVD(85%)/SR-230 (10%)/KIP100F (5%) | 39 | 2 | B |
| PUVD(70%)/SR-230 (25%)/KIP100F (5%) | 39 | Failed | N/A Brittle |
| PUVD(90%)/SR-230 (5%)/KIP100F (5%) | 62 | 5 | F |

5 = Excellent;
1 = Poor

The results indicate that increasing UV exposure time leads to both an increase in hardness and a loss of adhesion. Preferred conditions were found to beat about 5% photoinitiator concentration with about one minute of UV exposure time.

Example 2

The effect of higher absorption photoinitiators on PUVD curable resin compositions (as formed by reacting TMXDI with HBVD) containing 5 weight % of a Sartomer SR-230 diethylene glycol diacrylate reactive diluent was studied. Coating thickness and UV-irradiation source was varied. The cure results are set out below in Table 7.

TABLE 7

Evaluation of Higher Absorption Band Photoinitiators With Unpigmented PUVD/SR-230 (5%) Formulation

| Photo-initiator | Coating Thickness | UV source | Time in UV Machine, min | UV Exposure Time, sec | Coating Properties |
|---|---|---|---|---|---|
| KIP-100F, 5% | 2 mil | H bulb | 1 | 4 | Adherent, hard |
| KT-046, 5% | 2 mil | H bulb | 1 | 4 | Adherent, soft |
| KT-046, 5% | 2 mil | D and H bulbs | 2 | 7 | Adherent, soft |
| KT-046, 5% | 2 mil | V and H bulbs | 2 | 7 | Adherent, soft |
| CIBA 819 (2.5%) and CIBA 4265 (2.5%) | 0.5 mil | V and H bulbs | 2 | 7 | Adherent, hard |

Example 3

The cure of PUVD resin compositions (as formed by reacting TMXDI with HBVD) having an added titanium dioxide pigment, were studied. Pigment incorporation requires high shear mixers for effective breakup of pigment compounds. Present experiments were carried out in small quantities and pigments were incorporated using an agate mortar and pestle. The mixture was grinded for about 3 minutes.

UV sources with higher spectral output were used to match the photoinitiator. Higher absorption band pigments necessitate the use of longer wavelength UV lamps for the cure of pigmented materials. Therefore, two such bulbs V and D, with spectral output greater than 300 nm, were obtained from Fusion UV Company. These bulbs were used by themselves or in combination with the conventional H bulb depending on the resin/pigment properties. In some cases, the V and D bulbs were used for the initial cure where the longer wavelength irradiation more readily penetrates into the depth of the coating. The coatings may then be subjected to UV irradiation by the shorter wavelength H bulb to complete the cure at the surface.

The effects of coating thickness, UV irradiation time and type and amount and type of photoinitiator on coating properties were studied. These results are set out below in Table 8.

TABLE 8

Coatings obtained with pigmented samples (10% TiO$_2$)

| Photo-initiator | Coating Thickness | UV source | Time in UV Machine, min | UV Exposure Time, sec | Coating Properties |
|---|---|---|---|---|---|
| KT-046, 5% | 2 mil | V and H bulbs | 1 | 4 | Adherent, soft |
| KT-046, 5% | 2 mil | D and H bulbs | 2 | 7 | Adherent, soft |
| KT-046, 5% | 1 mil | D and H bulbs | 2 | 7 | Adherent, soft |
| KT-046, 1% | 2 mil | V and H bulbs | 2 | 7 | Tack free, incomplete cure |
| KT-046 (2.5%) and KIP-100F (2.5%) | 2 mil | V/H bulbs | 1 | 4 | Surface wrinkling |
| KT-046 (2.5%) and KIP-100F (2.5%) | 2 mil | H bulb | 1 | 4 | Surface wrinkling |
| CIBA 819 (2.5%) and CIBA 4265 (2.5%) | 0.5 mil | V and H bulbs | 2 | 7 | Smooth surface, full cure, adherent coating |

The results show that pigmented coatings can be applied in layers to obtain the desired thickness and successful cure of pigmented coatings was possible using CIBA 819 and 4265 photoinitiators. This pigmented coating was subjected to testing according to the military aircraft coating specifications (MIL-C-83286B, USAF). The following results were obtained:
1. Adhesion- Excellent. Class 5 with ASTMD3359-78.
2. Hardness-Pencil Test:5B, ASTM D-3363-92a.
3. Solvent Resistance: MEK Resistance: 25 double rubs. No marring, slight material removal.
4. Fluid Resistance. Coatings in excellent condition after 24 hours exposure to 5606 hydraulic fluid, JP-A jet fuel and 30w motor oil.
5. Tape test—No marring.

A second set of pigmentation experiments were carried out by adding 10% by weight of titanium dioxide and 5% carbon black to the baseline PUVD formulation using mortar and pestle. This formulation was then blended with photoinitiators CIBA 819 (2.5%) and CIBA 4265 (2.5%). Two layers of 0.5 mil were coated on aluminum panels. The coatings are irradiated using V and D bulbs for about 1 minute after application of each layer. The coated samples cured to a hard, smooth coating.

Example 4

The cure of PUVD resin compositions (as formed by reacting TMXDI with HBVD) having added fillers, were studied. A resin composition was prepared comprising PUVD resin (90 wt %), SR-230 reactive diluent (5 wt %), CIBA 4265 photoinitiator (2.5 wt %) and CIBA 819 photoinitiator (2.5 wt %). To the resin composition, 57 wt % Ni coated carbon powder filler was added.

Coating thicknesses of 1,7 mil, 2.5 mil, 3.5 mil, 5 mil were studied. The coatings were first irradiated with a V lamp, for longer wavelength irradiation that readily penetrates into the depth of the coating. The coatings were then irradiated with the shorter wavelength H bulb to complete the cure at the surface. The exposure time was 12 seconds under each lamp.

It was unexpectedly found that the coating properties were not substantially adversely affected by the addition of filler.

Example 5

The cure of PUVD resin compositions (as formed by reacting TMXDI with HBVD) having a combination of both photoinitiator and thermal cure catalyst, was studied. A resin composition was prepared comprising PUVD resin (89 wt %), SR-230 reactive diluent (5 wt %), KIP 100F photoinitiator (5 wt %) and TPBP Peroxide thermal cure catalyst (1 wt %).

These experiments were carried out with the objective of increasing coating thickness in pigmented formulations. Because there is a substantial heat effect furing UV cure, it was of interest to assess the feasibility of combining both UV and thermal initiation for the UV cure of a PUVD based formulation.

The coating was exposed to UV irradiation for 4 seconds producing fully cured coatings having excellent adhesion and MEK resistance. It is concluded that a dual cure version of the PUVD formulation is entirely feasible, without substantial adverse effect on coating properties.

The present invention has been described in detail, including the preferred embodiments thereof. However, it will be appreciated that those skilled in the art, upon consideration of the present disclosure, may make modifications and/or improvements on this invention still within the scope and spirit of this invention as set forth in the following claims.

What is claimed:

1. A radiation curable resin composition, containing essentially no volatile organic components, comprising:
    at least one vinyl dioxolane end-capped oligomer, and
    at least one photoinitiator to initiate radiation polymerization and cure of the oligomer.

2. The radiation curable resin composition of claim 1, wherein the radiation polymerization and cure of the oligomer comprises UV, visible light or electron beam cure.

3. The radiation curable resin composition of claim 1, wherein the radiation polymerization and cure of the oligomer comprises UV-core.

4. The radiation curable resin composition of claim 1, wherein the vinyl dioxolane end-capped oligomer comprises a polyester acrylate, polyurethane, or copolymers or blends thereof.

5. The radiation curable resin composition of claim 4, wherein the vinyl dioxolane end-capped oligomer comprises a polyester.

6. The radiation curable resin composition of claim 5, wherein the polyester is derived from at least one ester of a polycarboxylic acid.

7. The radiation curable resin composition of claim 6, wherein the ester is dimethyl adipate or dimethyl 1,4-cyclohexanedicarboxylate.

8. The radiation curable resin composition of claim 4, wherein the vinyl dioxolane end-capped oligomer comprises a polyurethane.

9. The radiation curable resin composition of claim 8, wherein the polyurethane is derived from at least one isocyanate or polyisocyanate having the formula

wherein $R_6$ is an aliphatic or cycloaliphatic alkyl group having from 1 to about 10 carbon atoms or an aromatic group and p is at least 1, or at least one isocyanate-endcapped aliphatic urethane prepolymer having the formula

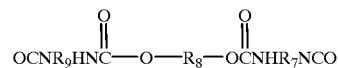

wherein $R_7$, $R_8$ and $R_9$ are independently an aliphatic or cycloaliphatic alkyl group having from 1 to about 10 carbons.

10. The coating composition of claim 8, wherein in the polyurethane is derived from at least one uretdione, isophorone diisocyanate, hexamethylene diisocyanate, 4,4-bis (cyclohexyl)methane diisocyanate, bis(4-isocyanato-cyclohexyl)methane, 1-methylcyclohexane-2,4-diisocyanate, 4,4',4"-tricyclohexylmethane triisocyanate, toluene diisocyanate (TDI), methylene-bis-diphenylisocyanate (MDI), and nathalene diisocyanate.

11. The radiation curable resin composition of claim 8, wherein the polyurethane comprises the reaction product of at least one aromatic isocyanate or polyisocyanate.

12. The radiation curable resin composition of claim 11, wherein the polyurethane is derived from tetramethyl xylene diisocyanate (TMXDI).

13. The radiation curable rosin composition of claim 4, wherein the vinyl dioxolane end-capped oligomer comprises an polyurethane acrylate.

14. The radiation curable resin composition of claim 13, wherein the polyurethane acrylate comprises the reaction product of an acrylate and at least one of a branched polyfunctional isocyanate, aliphatic isocyanate-terminated urethane prepolymer, or aliphatic isocyanate-terminated polyester.

15. The radiation curable resin composition of claim 14, wherein the polyurethane acrylate comprises the reaction product of an acrylate and at least one aliphatic isocyanate-terminated urethane prepolymer.

16. The radiation curable resin composition of claim 15, wherein the aliphatic isocyanate-terminated urethane prepolymer has a molecular weight ranging from about 500 to 1000.

17. The radiation curable resin composition of claim 16, wherein the aliphatic isocyanate-terminated urethane prepolymer has a molecular weight ranging from about 500 to 600.

18. The radiation curable resin composition of claim 13, wherein the polyurethane acrylate comprises the reaction product of an acrylate and at least one hexamethylene diisocyanate (HMDI)-terminated polyethyleneadipate aliphatic urethane prepolymer.

19. The radiation curable resin composition of claim 1, wherein the vinyl dioxolane end-caps comprise substituted or unsubstituted vinyl hydroxy alkyl dioxolanes and vinyl carboxy alkyl dioxolanes, having from 2 to about 10 carbons.

20. The radiation curable resin composition of claim 19, wherein the vinyl-dioxolane end-caps are derived from 2-vinyl-4-hydroxybutyl-1,3-dioxolane (HBVD) or 2-vinyl4-hydroxymethyl-1,3-dioxolane (HMVD).

21. The radiation curable resin composition of claim 1, wherein the photoinitiator comprises at least one alpha hydroxy ketone.

22. The radiation curable resin composition of claim 21, wherein the alpha hydroxy ketone comprises a polymeric hydroxy ketone.

23. The radiation curable resin composition of claim 1, wherein the photoinitiator is added in amounts of from about 0.5 to about 10 weight percent.

24. The radiation curable resin composition of claim 1, wherein the photoinitiator is added in amounts of from about 2 to about 6 weight percent.

25. The radiation curable resin composition of claim 1, wherein the photoinitiator is added in amounts of from about 4 to about 5 weight percent.

26. The radiation curable resin composition of claim 1, wherein the coating composition is sprayable.

27. The radiation curable resin composition of claim 26 further comprising a reactive diluent.

28. The radiation curable resin composition of claim 27, wherein the reactive diluent comprises at least one unsubstituted or monosubstituted vinyl dioxolane monomer.

29. The radiation curable resin composition of claim 28, wherein the vinyl dioxolane monomer comprises a polyester vinyl dioxolane (PEVD).

30. The radiation curable resin composition of claim 27, wherein the reactive diluent is added in amounts of up to about 50 weight percent.

31. The radiation curable resin composition of claim 30, wherein the reactive diluent is added in amounts of up to about 25 weight percent.

32. The radiation curable resin composition of claim 31, wherein the reactive diluent is added in amounts of up to about 10 weight percent.

33. The radiation curable resin composition of claim 27, wherein the reactive diluent has a viscosity from about 10 to about 200 mPa·s at about 23° C.

34. The radiation curable resin composition of claim 1 further comprising a pigment.

35. The radiation curable resin composition of claim 34, wherein the pigment is selected from titanium dioxide and carbon black.

36. The radiation curable resin composition of claim 34, wherein the pigment is added in amounts of about 0.1 to 30 weight percent.

37. The radiation curable resin composition of claim 36, wherein the pigment is added in amounts of about 1 to about 25 weight percent.

38. The radiation curable resin composition of claim 34, wherein the photoinitiator comprises at least one of polymeric hydroxy ketone, trimethylbenzophenone, methylbenzophenone, benzyl dimethyl ketal, benzophenone.

39. The radiation curable resin composition of claim 1 wherein the one vinyl dioxolane end-capped radiation curable oligomer is derinved from 2-vinyl-4-hydroxybutyl-1,3-dioxolane (HBVD), tetramethyl xylene diisocyanate (TMXDI) and an alpha hydroxy ketone photoinitiator.

40. The radiation curable resin composition of claim 1 further comprising a co-initiator.

41. The radiation curable resin composition of claim 40, wherein the co-initiator is a reactive amine.

42. The radiation curable resin composition of claim 40, wherein the co-initiator is added in amounts of from about 0.1 to about 5 weight percent.

43. The radiation curable resin composition of claim 40, wherein the co-initiator is added in amounts of from about 3 to about 5 weight percent.

44. The radiation curable resin composition of claim 1 further comprising a wetting agent.

45. The radiation curable resin composition of claim 44, wherein the wetting agent is added in amounts of from about 0.1 to 0.5 weight percent.

46. The radiation curable resin composition of claim 1 further comprising a coupling agent.

47. The radiation curable resin composition of claim 46, wherein the coupling agent is a silane coupling agent.

48. The radiation curable resin composition of claim 46, wherein the coupling agent is added in amounts of from about 0.5 to about 1.5 weight percent.

49. The radiation curable resin composition of claim 1 further comprising a thixotropic agent.

50. The radiation curable resin composition of claim 49 wherein the thixotropic agent is fumed silica.

51. The radiation curable resin composition of claim 49, wherein the thixotropic agent is added in amounts of from about 0.1 to 10 weight percent.

52. A radiation curable resin composition, containing essentially no volatile organic components, comprising the reaction product of:
(a) at least one polyester prepolymer which comprises the reaction product of
   (1) at least one substituted vinyl dioxolane monomer having the formula

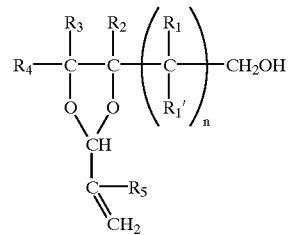

wherein $R_1$ and $R_1'$ are independently hydrogen or an alkyl group having from 1 to 10 carbon atoms, n is a number from 0 to about 10, and $R_2$, $R_3$, $R_4$, and $R_5$ are independently hydrogen or an alkyl group having from 1 to about 10 carbon atoms; and
   (2) at least one
      (i) ester of a polycarboxylic acid; or
      (ii) hydroxy-functional acrylate; or
      (iii) at least one isocyanate or polyisocyanate; or
      (iv) at least one isocyanate-endcapped aliphatic or aromatic urethane prepolymer, and
(b) at least one photoinitiator to initiate UV of visible light polymerization and cure of the composition.

53. A radiation curable resin composition of claim 52 wherein the at least one isocyanate or polyisocyanate has the formula $R_6(NCO)_p$ wherein $R_6$ is an aliphatic or cycloaliphatic alkyl group having from 1 to about 10 carbon atoms or an aromatic group and p is at least 1, and wherein the least one isocyanate-endcapped aliphatic urethane prepolymer has the formula

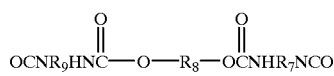

wherein $R_7$, $R_8$ and $R_9$ are independently an aliphatic or cycloaliphatic alkyl group having from 1 to about 10 carbons.

54. The radiation curable resin composition of claim 52, wherein the vinyl dioxolane monomer comprise substituted or unsubstituted vinyl hydroxy alkyl dioxolanes and vinyl carboxy alkyl dioxolanes, having from 2 to about 10 carbons.

55. The radiation curable resin composition of claim 54, wherein the vinyl dioxolane monomer is 2-vinyl-4-hydroxybutyl-1,3-dioxolane (HBVD) or 2-vinyl-4-hydroxymethyl-1,3-dioxolane (HMVD).

56. A method of providing a radiation curable polymer coating, the method comprising applying a radiation curable resin composition containing essentially no volatile organic components on a substrate and enabling radiation polymerization and cure of the resin composition, wherein the radiation curable resin comprises:
   at least one one vinyl dioxolane end-capped oligomer, and
   at least one photoinitiator to initiate radiation polymerization and cure of the composition.

57. The radiation curable resin composition of claim 21, wherein the photoinitiator comprises a mixture of an oligomeric alpha hydroxy ketone and 2-hydroxy-2-methyl-1-phenyl 1-propanone.

58. The radiation curable resin composition of claim 21, wherein the photoinitiator comprises 70 wt % of oligo(2-hydroxy-2-methyl-1-[4-(1-methylvinyl)phenyl]propanone]) and 30 wt % of 2-hydroxy-2-methyl-1-phenyl 1-propanone.

59. The radiation curable resin composition of claim 21, wherein the photoinitiator comprises a blend of 2,4,6-trimethylbenzoyldiphenylphosphine oxide, alpha-hydroxyketone and benzophenone derivative.

60. The radiation curable resin composition of claim 1, wherein the photoinitiator comprises 2 hydoxy-2-ethyl-phenyl-1-propane.

61. The radiation curable resin composition of claim 1, wherein the photoinitiator comprises bis(2,4,6-trimethylbenzoyl)-phenylphosphineoxide.

62. The radiation curable resin composition of claim 1, wherein the photoinitiator comprises 1-hydroxy cyclohexyl phenyl ketone.

63. The radiation curable resin composition of claim 1, wherein the photoinitiator comprises bis $\eta^5$-2,4-cyclopentadien-1-yl)bis(2,6-difluoro-3-(1H-pyrrol-1-yl)phenyl)titanium.

64. The radiation curable resin composition of claim 1, wherein the photoinitiator comprises at least one of an alpha hydroxy ketone, a polymeric hydroxy ketone, trimethylbenzophene, methylbenzophenone, 2 hydroxy-2-ethyl-phenyl-1-propane, phosphine oxide, bis(2,4,6-trimethylbenzoyl)-phenylphosphineoxide, 1-hydroxy cyclohexyl ketone, benzyl dimethyl ketal, trimethylbenzophenone, benzophenone, and bis $\eta^5$-2,4-cyclopentadien-1-yl) bis(2,6-difluoro-3-(1H-pyrrol-1-yl) phenyl) titanium.

65. The radiation curable resin composition of claim 27, wherein the reactive diluent comprises at least one of diethylene glycol diacrylate (DGD), tetrahydrofurfuryl acrylate, 2-phenoxyethyl acrylate, isooctyl acrylate, propoxylated neopentyl glycol diacrylate, triethyleneglycol diacrylate, hexanediol diacrylate, lauryl acrylate or trimethylopropane triacrylate (TMPTA).

66. The radiation curable resin composition of claim 1 further comprising at least one thermal cure catalyst to initiate thermal cure of the oligomer.

67. The radiation curable resin composition of claim 66, wherein the thermal cure catalyst is at least one of a peroxide or cobalt composition.

68. The radiation curable resin composition of claim 67, wherein the thermal cure catalyst is a peroxide combined with at least one transition metal soap.

69. The radiation curable resin composition of claim 67, wherein the peroxide is a high temperature peroxide comprising at least one of a tertiary butyl perbenzoate, 2,5-dimethyl-2,5-di(t-butylperoxy)hexane, dicumylperoxide, benzoyl peroxide and MEK peroxide.

70. The radiation curable resin composition of claim 1 further comprising at least one filler.

71. The radiation curable resin composition of claim 70, wherein the filler is an organic filler, inorganic filler or blends thereof.

72. The radiation curable resin composition of claim 71, wherein the filler comprises at least one of a Ni coated carbon powder, an iron powder, titanium dioxide, carbon black or thiokol blue.

* * * * *